(12) United States Patent
Safran et al.

(10) Patent No.: US 12,518,879 B2
(45) Date of Patent: Jan. 6, 2026

(54) ANATOMICALLY CORRECT RECONSTRUCTION OF AN ATRIUM

(71) Applicant: Biosense Webster (Israel) Ltd., Yokneam (IL)

(72) Inventors: Moshe Safran, Jerusalem (IL); Meir Bar-Tal, Haifa (IL); Liron Mizrahi, Kiryat Bialik (IL); Alona Sigal, Beit Hanania (IL); Alon Baram, Yokneam Ilit (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 1124 days.

(21) Appl. No.: 17/410,045

(22) Filed: Aug. 24, 2021

(65) Prior Publication Data

US 2023/0068315 A1 Mar. 2, 2023

(51) Int. Cl.
*G16H 50/50* (2018.01)
*G06T 17/20* (2006.01)
*G16H 20/40* (2018.01)
*G16H 40/67* (2018.01)
*G16H 50/20* (2018.01)

(52) U.S. Cl.
CPC .............. *G16H 50/50* (2018.01); *G06T 17/20* (2013.01); *G16H 20/40* (2018.01); *G16H 50/20* (2018.01); *G06T 2210/41* (2013.01); *G16H 40/67* (2018.01)

(58) Field of Classification Search
CPC ........ G16H 50/50; G16H 20/40; G16H 50/20; G06T 17/20; G06T 2210/41
USPC .......................................................... 703/1
See application file for complete search history.

(56) References Cited

U.S. PATENT DOCUMENTS

| 6,226,542 | B1 * | 5/2001 | Reisfeld | G06T 17/20 600/407 |
| 6,301,496 | B1 * | 10/2001 | Reisfeld | A61B 5/287 600/407 |
| 6,814,733 | B2 | 11/2004 | Schwartz et al. | |
| 6,892,091 | B1 * | 5/2005 | Ben-Haim | A61B 5/287 600/509 |

(Continued)

FOREIGN PATENT DOCUMENTS

EP 2824639 A2 1/2015

OTHER PUBLICATIONS

European Search report for corresponding EPA No. 22191639.8 dated Jan. 27, 2023.

(Continued)

*Primary Examiner* — Iftekhar A Khan
(74) *Attorney, Agent, or Firm* — Volpe Koenig

(57) ABSTRACT

A method is provided. The method includes receiving, by a reconstruction engine executed by processors, inputs respective to an anatomical structure and computing, by a model-based fast anatomical mapping of the reconstruction engine, an initial transformation that selects parametric model that best fits the inputs. The method further includes executing, by the model-based fast anatomical mapping, an iterative optimization. The iterative optimization include constructing a statistical prior based on the parametric model and applying the parametric model to the inputs and the statistical prior to produce an isosurface of the anatomical structure. The method further includes generating, by the reconstruction engine, an output including the isosurface.

20 Claims, 15 Drawing Sheets

(56) References Cited

U.S. PATENT DOCUMENTS

| | | | |
|---|---|---|---|
| 6,997,924 B2 | 2/2006 | Schwartz et al. | |
| 7,156,816 B2 | 1/2007 | Schwartz et al. | |
| 7,536,218 B2 | 5/2009 | Govari et al. | |
| 7,756,576 B2 | 7/2010 | Levin | |
| 8,010,175 B2* | 8/2011 | O'Donnell | G06T 7/149 |
| | | | 600/407 |
| 8,568,406 B2* | 10/2013 | Harlev | A61B 5/063 |
| | | | 600/509 |
| 8,948,853 B2* | 2/2015 | Harlev | A61B 5/068 |
| | | | 600/509 |
| 9,014,793 B2* | 4/2015 | Harlev | A61B 5/053 |
| | | | 600/509 |
| 9,259,287 B2* | 2/2016 | Mansi | A61B 34/10 |
| 9,277,872 B2* | 3/2016 | Harlev | A61B 5/6852 |
| 9,405,996 B2* | 8/2016 | Lonasec | G06T 13/20 |
| 9,576,107 B2* | 2/2017 | Safran | A61B 5/0538 |
| 10,413,185 B1* | 9/2019 | Boveja | A61B 5/0035 |
| 10,482,198 B2* | 11/2019 | Auerbach | A61B 34/10 |
| 11,039,883 B1* | 6/2021 | Boveja | A61B 8/0883 |
| 11,468,567 B2* | 10/2022 | Groth | G16H 15/00 |
| 11,690,551 B2* | 7/2023 | Baram | G06T 7/55 |
| | | | 600/509 |
| 11,937,975 B2* | 3/2024 | Baram | A61B 8/4477 |
| 11,974,881 B2* | 5/2024 | Veronesi | A61B 8/5207 |
| 2004/0252870 A1* | 12/2004 | Reeves | G06T 7/136 |
| | | | 382/128 |
| 2006/0052706 A1* | 3/2006 | Hynynen | A61N 7/022 |
| | | | 600/459 |
| 2010/0070249 A1* | 3/2010 | Lonasec | G16H 30/20 |
| | | | 703/2 |
| 2011/0096964 A1* | 4/2011 | Zheng | G06T 7/143 |
| | | | 382/128 |
| 2011/0160569 A1* | 6/2011 | Cohen | A61B 5/064 |
| | | | 600/424 |
| 2011/0319714 A1 | 12/2011 | Roelle et al. | |
| 2013/0072790 A1* | 3/2013 | Ludwig | G06F 17/00 |
| | | | 703/11 |
| 2014/0088429 A1* | 3/2014 | Lomes | G01S 15/8945 |
| | | | 600/443 |
| 2014/0235996 A1* | 8/2014 | Kim | A61B 5/367 |
| | | | 600/512 |
| 2014/0296842 A1* | 10/2014 | Mansi | A61B 34/10 |
| | | | 703/2 |
| 2015/0018698 A1* | 1/2015 | Safran | A61B 5/0538 |
| | | | 600/508 |
| 2016/0022375 A1* | 1/2016 | Blake | G16H 50/00 |
| | | | 600/424 |
| 2016/0038248 A1* | 2/2016 | Bharadwaj | G06T 7/0012 |
| | | | 715/771 |
| 2016/0058520 A1* | 3/2016 | Yang | A61B 34/10 |
| | | | 703/11 |
| 2016/0063726 A1* | 3/2016 | Wenzel | G06T 7/12 |
| | | | 382/128 |
| 2016/0081744 A1* | 3/2016 | Wang | A61B 5/201 |
| | | | 606/41 |
| 2016/0140751 A1* | 5/2016 | Jafarkhani | A61B 8/466 |
| | | | 382/131 |
| 2016/0171692 A1* | 6/2016 | Blumhofer | G06T 7/337 |
| | | | 382/128 |
| 2017/0086694 A1* | 3/2017 | Stewart | A61B 5/349 |
| 2017/0325891 A1* | 11/2017 | Harlev | G06T 17/00 |
| 2018/0174068 A1* | 6/2018 | Dahl | G16H 50/50 |
| 2019/0021865 A1* | 1/2019 | Vogtmeier | A61F 2/28 |
| 2019/0142509 A1* | 5/2019 | Harmouche | A61B 18/02 |
| | | | 606/34 |
| 2020/0196885 A1* | 6/2020 | Harlev | A61B 5/062 |
| 2020/0352652 A1* | 11/2020 | Amit | G16H 40/63 |
| 2021/0259773 A1* | 8/2021 | Audigier | G16H 50/50 |
| 2021/0398350 A1* | 12/2021 | Schmidt | G06T 19/20 |
| 2021/0407091 A1* | 12/2021 | Laji | B33Y 80/00 |
| 2022/0044787 A1* | 2/2022 | Kaufman | G16H 20/40 |
| 2022/0130046 A1* | 4/2022 | Schreckenberg | G06T 19/006 |
| 2022/0343605 A1* | 10/2022 | Munro Simpson | |
| | | | G06F 3/04845 |
| 2023/0068315 A1* | 3/2023 | Safran | G16H 20/40 |
| 2023/0281842 A1* | 9/2023 | Ribeiro | G06V 10/26 |
| | | | 382/132 |

OTHER PUBLICATIONS

Schwartz Arie Lorin et al: "Reconstruction of the left atrium for atrial fibrillation ablation using the machine learning CARTO 3 m-FAM software", Journal of Interventional Cardiac Electrophysiology, Springer New York LLC, US, vol. 64, No. 1, Aug. 12, 2021, pp. 39-47, XP037879805.

* cited by examiner

TABLE 1300

|  | 4 PV | Left short common | Left long common | Right common | Middle right PV | Other variants not included |
|---|---|---|---|---|---|---|
| % of cases used to develop the model | 44% | 56% we agreed to combine these types. | 0 | 0 | 0 | |

FIG. 13

ANATOMICALLY CORRECT RECONSTRUCTION OF AN ATRIUM

FIELD OF INVENTION

The present invention is related to a machine learning and/or an artificial intelligence method and system. More particularly, the present invention relates to a machine learning/artificial intelligence algorithm that provides an anatomically correct reconstruction of an atrium.

BACKGROUND

Medical catheterizations are routinely carried out in cases of cardiac arrhythmias, such as atrial fibrillation. Atrial fibrillation occurs when regions of cardiac tissue abnormally conduct electric signals to adjacent tissue (e.g., unwanted electrical signals), thereby disrupting the normal cardiac cycle and causing asynchronous rhythm.

Procedures for treating cardiac arrhythmias include surgically disrupting an origin of the unwanted electrical signals causing a cardiac arrhythmia, as well as disrupting unwanted conducting pathways for such signals, by selectively ablating cardiac tissue by an application of energy (e.g., radiofrequency energy via a catheter). More particularly, the ablation process destroys the unwanted conducting pathways by formation of non-conducting lesions, thereby ceasing or modifying the propagation of the unwanted electrical signals from one portion of the heart to another.

Currently, fast anatomical mapping (FAM) algorithms can be used in electrophysiological mapping procedures to digitally construct an atrial anatomy map, which can be further used by a physician (or a medical professional or clinician) during ablation. In this regard, FAM algorithms generate a three dimensional reconstruction of a left atrium shape by applying a standard ball-pivoting algorithm to a point cloud data acquired by a catheter. Point cloud data can include an initial set of scattered information, whether from surface or internal electrodes, using ultrasound. Yet, this atrial anatomy map does not consider any underlying anatomy, fails to provide no information in areas where the catheter has not yet visited, and includes anatomically incorrect artifacts due to deformation of the atrium by the catheter during the mapping procedure, such as merging of an appendage and left superior pulmonary vein (PV).

In some cases, alternatively to the FAM algorithms, physicians may perform point-by-point mapping by acquiring a small number of contact points and using standard simple meshing methods. Yet, point-by-point mapping results in a rough map that has limited use to physicians due to inaccuracies therein.

Thus, because of the noted shortcomings of FAM algorithms and standard simple meshing methods, there is a need to accurately generate an improved, anatomically correct reconstruction (e.g., map) of atrial anatomy.

SUMMARY

According to an exemplary embodiment, a method is provided for generating an anatomically correct reconstruction of an atrium using a machine learning/artificial intelligence algorithm. The method includes receiving, by a reconstruction engine executed by one or more processors, one or more inputs respective to an anatomical structure and computing, by a model-based fast anatomical mapping of the reconstruction engine, an initial transformation that at least selects a parametric model that best fits the one or more inputs. The method further includes executing, by the model-based fast anatomical mapping of the reconstruction engine, at least one iterative optimization. The at least one iterative optimization includes constructing a statistical prior based on the parametric model and applying the parametric model to the one or more inputs and the statistical prior to produce an isosurface of the anatomical structure. The method further includes generating, by the reconstruction engine, an output comprising at least the isosurface.

According to one or more embodiments, the exemplary method embodiment described above can be implemented as an apparatus, a system, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 13 illustrates a table according to one or more exemplary embodiments;

DETAILED DESCRIPTION

Figure 1:
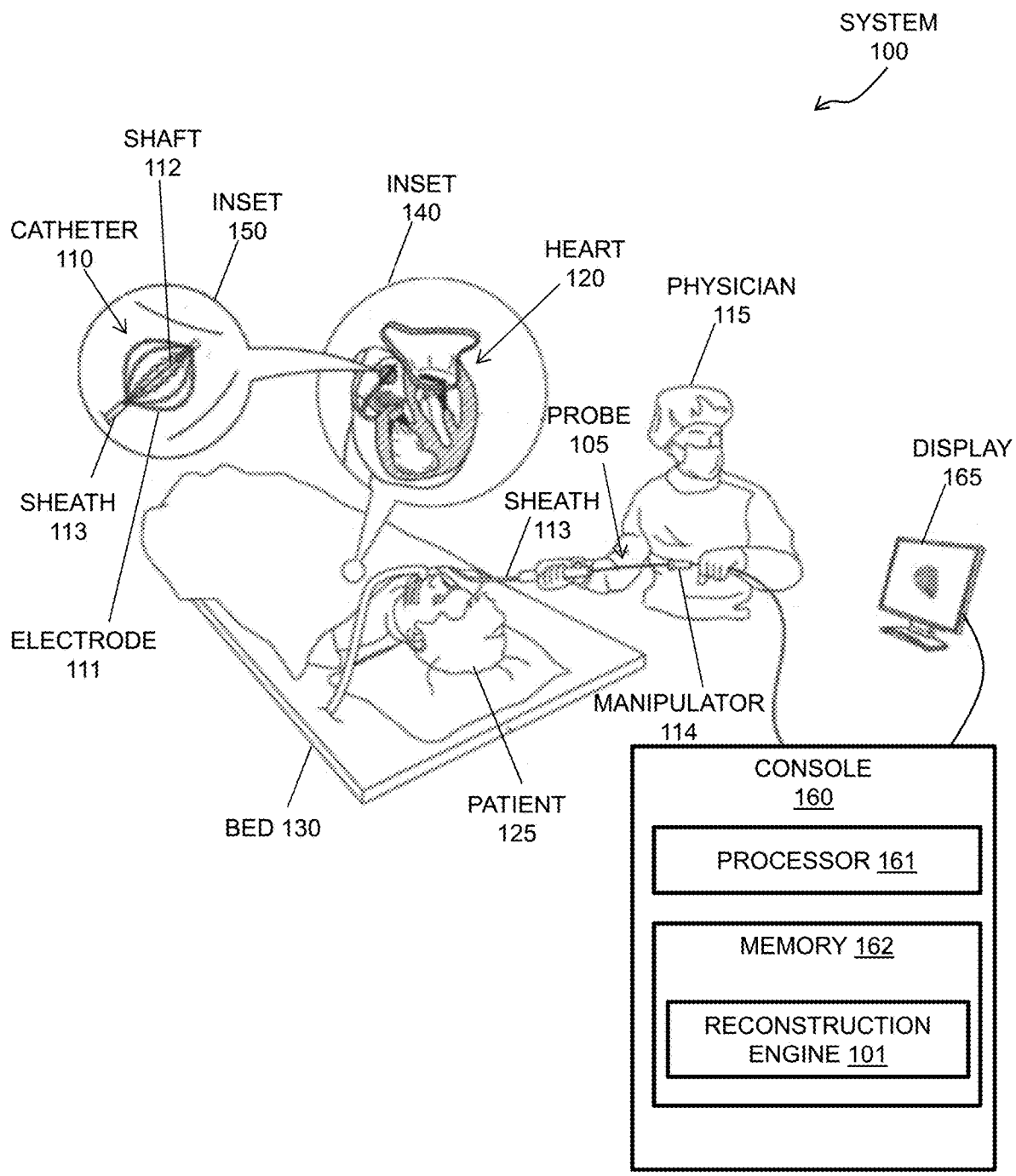
FIG. 1 illustrates a diagram of an exemplary system in which one or more features of the disclosure subject matter can be implemented according to one or more embodiments.

Disclosed herein is a machine learning and/or an artificial intelligence method and system implemented by a reconstruction engine. More particularly, the present invention relates to a reconstruction engine including a machine learning/artificial intelligence algorithm that provides an anatomically correct reconstruction of an atrium, such as by accurately generating an improved, anatomically correct atrial anatomy map using as few data points as possible.

The atria (e.g., a left atrium and a right atrium) of a heart is a complicated three-dimensional structure where the walls have dimensions that differ from person to person. With respect to the left atrium, a same underlying shape can persist between person to person. The left atrium can further be divided into a number of substructures, such as a PV, a mitral (e.g., bicuspid) valve, and a septum. And, while these sub-structures also typically differ from person to person, each substructure has a same underlying shape for the overall left atrium. In addition, a given substructure can have a same relationship to the other substructures of the heart, regardless of the individual differences in shapes of the substructures.

According to one or more embodiments, the reconstruction engine includes, implements, and utilizes a model-based FAM ("mFAM") algorithm to generate the improved, anatomically correct atrial anatomy map of left atrium. In this regard, the reconstruction engine and the mFAM algorithm generate/define a parametric model. The parametric model can be a fixed model representing a shape of a substructure of a left atrium. The parametric model include parameters, each receiving varying values according to the atrial anatomy of the person being mapped.

The reconstruction engine and the mFAM algorithm use the parametric model to construct a statistical prior of the shape of the substructure of the left atrium from a dataset of other instances of the substructure (e.g., values from other mappings). The reconstruction engine and the mFAM algorithm further fit/apply the parametric model to point cloud data (e.g., an initial set of scattered ultrasound information) and the statistical prior to produce an isosurface of the substructure shape. The isosurface can be considered an improved, anatomically correct atrial anatomy map using as few data points as possible. In this regard, the isosurface can be a three dimensional surface representation of the substructure shape using points with equal values in a three dimensional data distribution. The reconstruction engine then displays the isosurface for use by a physician during ablation and/or stores the isosurface for use by the reconstruction engine during refining of the parametric model.

One or more advantages, technical effects, and/or benefits of the reconstruction engine can include generating and providing the isosurface to physicians, which otherwise is not available through conventional mappings (e.g., FAM algorithms and standard simple meshing methods). That is, the reconstruction engine particularly utilizes the mFAM algorithm, which require fewer samples/data points/points, to reduce processing loads for medical device equipment and to transform medical device equipment operations to more accurate mapping machines.

For ease of explanation, the reconstruction engine is described herein with respect to mapping a heart (e.g., a left atria shape); however, any anatomical structure, body part, organ, or portion thereof can be a target for mapping by the reconstruction engine described herein. Further, the reconstruction engine and/or the machine learning/artificial intelligence algorithm is a processor executable code or software that is necessarily rooted in process operations by, and in processing hardware of, medical device equipment. According, the reconstruction engine can be implemented in any one or a combination of software, firmware, processor, or circuitry configured to execute the reconstruction engine.

According to one or more embodiments, a method is provided. The method includes receiving, by a reconstruction engine executed by one or more processors, one or more inputs respective to an anatomical structure; computing, by a model-based fast anatomical mapping of the reconstruction engine, an initial transformation that at least selects a parametric model that best fits the one or more inputs; executing, by the model-based fast anatomical mapping of the reconstruction engine, at least one iterative optimization. The at least one iterative optimization includes constructing a statistical prior based on the parametric model and applying the parametric model to the one or more inputs and the statistical prior to produce an isosurface of the anatomical structure. The method further includes generating, by the reconstruction engine, an output comprising at least the isosurface.

According to one or more embodiments or any of the method embodiments herein, the one or more inputs can include catheter points and anatomical tags for points from right and left sides of the anatomical structure.

According to one or more embodiments or any of the method embodiments herein, the anatomical structure can include a left atrium.

According to one or more embodiments or any of the method embodiments herein, the parametric model can be a fixed model selected based on parameters representing a shape of the anatomical structure or a substructure thereof.

According to one or more embodiments or any of the method embodiments herein, the at least one iterative optimization can include any one of computing cost and constraint functions, computing cost and constraint derivatives, updating parameters, updating the one or more inputs, updating optimization hyperparameters, or updating one or more tube cuts.

According to one or more embodiments or any of the method embodiments herein, the at least one iterative optimization can include a blending of the parametric model with a minimum number of point cloud data of the one or more inputs and the statistical prior to produce as the isosurface an anatomically correct reconstruction of the anatomical structure.

According to one or more embodiments or any of the method embodiments herein, the output can include the isosurface, a three dimensional mesh rendering, or anatomical mesh colorings According to one or more embodiments or any of the method embodiments herein, the output can be displayed by the reconstruction engine during an ablation procedure on a display.

According to one or more embodiments or any of the method embodiments herein, the reconstruction engine can receive subsequent inputs and can perform the iterative optimization to adapt the isosurface to the subsequent inputs.

According to one or more embodiments or any of the method embodiments herein, the subsequent inputs can include any one of preferred magnet points, subsequent anatomical tags, or user edits.

According to one or more embodiments, a system is provided. The system includes a memory configured to store processor executable program instructions of a reconstruction engine. The system also includes at least one processor configured to execute the program instructions of the mapping engine to cause the system to: receive one or more inputs respective to an anatomical structure; compute an initial transformation that at least selects a parametric model that best fits the one or more inputs; execute at least one iterative optimization (e.g., the at least one iterative optimization includes constructing a statistical prior based on the parametric model and applying the parametric model to the one or more inputs and the statistical prior to produce an isosurface of the anatomical structure); and generate an output comprising at least the isosurface.

According to one or more embodiments or any of the system embodiments herein, the one or more inputs can include catheter points and anatomical tags for points from right and left sides of the anatomical structure.

According to one or more embodiments or any of the system embodiments herein, the anatomical structure can include a left atrium.

According to one or more embodiments or any of the system embodiments herein, the parametric model can be a fixed model selected based on parameters representing a shape of the anatomical structure or a substructure thereof.

According to one or more embodiments or any of the system embodiments herein, the at least one iterative optimization can include any one of computing cost and constraint functions, computing cost and constraint derivatives, updating parameters, updating the one or more inputs, updating optimization hyperparameters, or updating one or more tube cuts.

According to one or more embodiments or any of the system embodiments herein, the at least one iterative optimization can include a blending of the parametric model with a minimum number of point cloud data of the one or more inputs and the statistical prior to produce as the isosurface an anatomically correct reconstruction of the anatomical structure.

According to one or more embodiments or any of the system embodiments herein, the output can include the isosurface, a three dimensional mesh rendering, or anatomical mesh colorings According to one or more embodiments or any of the system embodiments herein, the output can be displayed by the reconstruction engine during an ablation procedure on a display.

According to one or more embodiments or any of the system embodiments herein, the reconstruction engine can receive subsequent inputs and can perform the iterative optimization to adapt the isosurface to the subsequent inputs.

According to one or more embodiments or any of the system embodiments herein, the subsequent inputs can include any one of preferred magnet points, subsequent anatomical tags, or user edits.

FIG. 1 is a diagram of an example system (e.g., medical device equipment), shown as a system 100, in which one or more features of the subject matter herein can be implemented according to one or more embodiments. All or part of the system 100 can be used to collect information (e.g., biometric data and/or a training dataset) and/or used to implement a reconstruction engine 101 (e.g., a machine learning and/or an artificial intelligence algorithm) as described herein. The reconstruction engine 101 can be defined as an optimization in which model parameters that best fit data and prior statistical knowledge are estimated in an iterative process.

The system 100, as illustrated, includes a probe 105 with a catheter 110 (including at least one electrode 111), a shaft 112, a sheath 113, and a manipulator 114. The system 100, as illustrated, also includes a physician 115 (or a medical professional or clinician), a heart 120, a patient 125, and a bed 130 (or a table). Note that insets 140 and 150 show the heart 120 and the catheter 110 in greater detail. The system 100 also, as illustrated, includes a console 160 (including one or more processors 161 and memories 162) and a display 165. Note further each element and/or item of the system 100 is representative of one or more of that element and/or that item. The example of the system 100 shown in FIG. 1 can be modified to implement the embodiments disclosed herein. The disclosed embodiments can similarly be applied using other system components and settings. Additionally, the system 100 can include additional components, such as elements for sensing electrical activity, wired or wireless connectors, processing and display devices, or the like.

The system 100 can be utilized to detect, diagnose, and/or treat cardiac conditions (e.g., using the reconstruction engine 101). Cardiac conditions, such as cardiac arrhythmias, persist as common and dangerous medical ailments, especially in the aging population. For instance, the system 100 can be part of a surgical system (e.g., CARTO® system sold by Biosense Webster) that is configured to obtain biometric data (e.g., anatomical and electrical measurements of a patient's organ, such as the heart 120) and perform a cardiac ablation procedure. More particularly, treatments for cardiac conditions such as cardiac arrhythmia often require obtaining a detailed mapping of cardiac tissue, chambers, veins, arteries and/or electrical pathways. For example, a prerequisite for performing a catheter ablation (as described herein) successfully is that the cause of the cardiac arrhythmia is accurately located in a chamber of the heart 120. Such locating may be done via an electrophysiological investigation during which electrical potentials are detected spatially resolved with a mapping catheter (e.g., the catheter 110) introduced into the chamber of the heart 120. This electrophysiological investigation, the so-called electro-anatomical mapping, thus provides 3D mapping data which can be displayed on a monitor. In many cases, the mapping function and a treatment function (e.g., ablation) are provided by a single catheter or group of catheters such that the mapping catheter also operates as a treatment (e.g., ablation) catheter at the same time. In this case, the reconstruction engine 101 can be directly stored and executed by the catheter 110.

In patients (e.g., the patient 125) with normal sinus rhythm (NSR), the heart (e.g., the heart 120), which includes atrial, ventricular, and excitatory conduction tissue, is electrically excited to beat in a synchronous, patterned fashion. Note that this electrical excitement can be detected as intracardiac electrocardiogram (IC ECG) data or the like.

In patients (e.g., the patient 125) with a cardiac arrhythmia (e.g., atrial fibrillation or aFib), abnormal regions of cardiac tissue do not follow a synchronous beating cycle associated with normally conductive tissue, which is in contrast to patients with NSR. Instead, the abnormal regions of cardiac tissue aberrantly conduct to adjacent tissue, thereby disrupting the cardiac cycle into an asynchronous cardiac rhythm. Note that this asynchronous cardiac rhythm can also be detected as the IC ECG data. Such abnormal conduction has been previously known to occur at various regions of the heart 120, for example, in the region of the sino-atrial (SA) node, along the conduction pathways of the atrioventricular (AV) node, or in the cardiac muscle tissue forming the walls of the ventricular and atrial cardiac chambers. There are other conditions, such as flutter, where the pattern of abnormally conducting tissues lead to reentry paths such that the chamber beats in a regular pattern that can be multiple times the sinus rhythm.

In support of the system 100 detecting, diagnosing, and/or treating cardiac conditions, the probe 105 can be navigated by the physician 115 into the heart 120 of the patient 125 lying on the bed 130. For instance, the physician 115 can insert the shaft 112 through the sheath 113, while manipulating a distal end of the shaft 112 using the manipulator 114 near the proximal end of the catheter 110 and/or deflection from the sheath 113. As shown in an inset 140, the catheter 110 can be fitted at the distal end of the shaft 112. The catheter 110 can be inserted through the sheath 113 in a collapsed state and can be then expanded within the heart 120.

Generally, electrical activity at a point in the heart 120 may be typically measured by advancing the catheter 110 containing an electrical sensor at or near its distal tip (e.g., the at least one electrode 111) to that point in the heart 120, contacting the tissue with the sensor and acquiring data at that point. One drawback with mapping a cardiac chamber using a catheter type containing only a single, distal tip electrode is the long period of time required to accumulate data on a point-by-point basis over the requisite number of points required for a detailed map of the chamber as a whole. Accordingly, multiple-electrode catheters (e.g., the catheter 110) have been developed to simultaneously measure electrical activity at multiple points in the heart chamber.

The catheter 110, which can include the at least one electrode 111 and a catheter needle coupled onto a body thereof, can be configured to obtain biometric data, such as electrical signals of an intra-body organ (e.g., the heart 120), and/or to ablate tissue areas of thereof (e.g., a cardiac chamber of the heart 120). Note that the electrodes 111 are representative of any like elements, such as tracking coils, piezoelectric transducer, electrodes, or combination of elements configured to ablate the tissue areas or to obtain the biometric data. According to one or more embodiments, the catheter 110 can include one or more position sensors that used are to determine trajectory information. The trajectory information can be used to infer motion characteristics, such as the contractility of the tissue.

Biometric data (e.g., patient biometrics, patient data, or patient biometric data) can include one or more of local activation times (LATs), electrical activity, topology, bipolar mapping, reference activity, ventricle activity, dominant frequency, impedance, or the like. The LAT can be a point in time of a threshold activity corresponding to a local activation, calculated based on a normalized initial starting point. Electrical activity can be any applicable electrical signals that can be measured based on one or more thresholds and can be sensed and/or augmented based on signal to noise ratios and/or other filters. A topology can correspond to the physical structure of a body part or a portion of a body part and can correspond to changes in the physical structure relative to different parts of the body part or relative to different body parts. A dominant frequency can be a frequency or a range of frequency that is prevalent at a portion of a body part and can be different in different portions of the same body part. For example, the dominant frequency of a PV of a heart can be different than the dominant frequency of the right atrium of the same heart. Impedance can be the resistance measurement at a given area of a body part.

Examples of biometric data include, but are not limited to, patient identification data, IC ECG data, bipolar intracardiac reference signals, anatomical and electrical measurements, trajectory information, body surface (BS) ECG data, historical data, brain biometrics, blood pressure data, ultrasound signals, radio signals, audio signals, a two- or three-dimensional image data, blood glucose data, and temperature data. The biometrics data can be used, generally, to monitor, diagnosis, and treatment any number of various diseases, such as cardiovascular diseases (e.g., arrhythmias, cardiomyopathy, and coronary artery disease) and autoimmune diseases (e.g., type I and type II diabetes). Note that BS ECG data can include data and signals collected from electrodes on a surface of a patient, IC ECG data can include data and signals collected from electrodes within the patient, and ablation data can include data and signals collected from tissue that has been ablated. Further, BS ECG data, IC ECG data, and ablation data, along with catheter electrode position data, can be derived from one or more procedure recordings.

For example, the catheter 110 can use the electrodes 111 to implement intravascular ultrasound and/or MRI catheterization to image the heart 120 (e.g., obtain and process the biometric data). Inset 150 shows the catheter 110 in an enlarged view, inside a cardiac chamber of the heart 120. Although the catheter 110 is shown to be a point catheter, it will be understood that any shape that includes one or more electrodes 111 can be used to implement the exemplary embodiments disclosed herein.

Examples of the catheter 110 include, but are not limited to, a linear catheter with multiple electrodes, a balloon catheter including electrodes dispersed on multiple spines that shape the balloon, a lasso or loop catheter with multiple electrodes, a contact-force sensing catheter, or any other applicable shape or type. Linear catheters can be fully or partially elastic such that it can twist, bend, and or otherwise change its shape based on received signal and/or based on application of an external force (e.g., cardiac tissue) on the linear catheter. The balloon catheter can be designed such that when deployed into a patient's body, its electrodes can be held in intimate contact against an endocardial surface. As an example, a balloon catheter can be inserted into a lumen, such as a PV. The balloon catheter can be inserted into the PV in a deflated state, such that the balloon catheter does not occupy its maximum volume while being inserted into the PV. The balloon catheter can expand while inside the PV, such that those electrodes on the balloon catheter are in contact with an entire circular section of the PV. Such contact with an entire circular section of the PV, or any other lumen, can enable efficient imaging and/or ablation.

According to other examples, body patches and/or body surface electrodes may also be positioned on or proximate to a body of the patient 125. The catheter 110 with the one or more electrodes 111 can be positioned within the body (e.g., within the heart 120) and a position of the catheter 110 can be determined by the 100 system based on signals transmitted and received between the one or more electrodes 111 of the catheter 110 and the body patches and/or body surface electrodes. Additionally, the electrodes 111 can sense the biometric data from within the body of the patient 125, such as within the heart 120 (e.g., the electrodes 111 sense the electrical potential of the tissue in real time). The biometric data can be associated with the determined position of the catheter 110 such that a rendering of the patient's body part (e.g., the heart 120) can be displayed and show the biometric data overlaid on a shape of the body part.

The probe 105 and other items of the system 100 can be connected to the console 160. The console 160 can include any computing device, which employs the machine learning and/or an artificial intelligence algorithm (represented as the reconstruction engine 101). According to an exemplary embodiment, the console 160 includes the one or more processors 161 (any computing hardware) and the memory 162 (any non-transitory tangible media), where the one or more processors 161 execute computer instructions with respect the reconstruction engine 101 and the memory 162 stores these instructions for execution by the one or more processors 161. For instance, the console 160 can be configured to receive and process the biometric data and determine if a given tissue area conducts electricity.

In some embodiments, the console 160 can be further programmed by the reconstruction engine 101 (in software) to carry out the functions of generating/defining a parametric model of an anatomical structure, constructing a statistical prior of the anatomical structure, fitting/applying the parametric model to point cloud data and the statistical prior, generating/producing an isosurface of the anatomical structure, and displaying/storing the isosurface. For instance, the reconstruction engine 101 can include the mFAM algorithm (described herein with respect to FIGS. 3 and 6), that receives point cloud data and/or specific known points acquired by the catheter 110 as it is maneuvered within the anatomical structure. Once the isosurface is generated, the reconstruction engine 101 can receive inputs representing user modifications of the isosurface, such as through existing user interface and/or a specialized user interface of the reconstruction engine 101. Generally, the reconstruction engine 101 can provide one or more user interfaces, such as on behalf of the operating system or other application and/or directly as needed. The user interfaces include, but are not limited to, internet browsers, graphic user interfaces (GUIs), window interfaces, and/or other visual interfaces for applications, operating systems, file folders, and the like. According to one or more embodiments, the reconstruction engine 101 can be external to the console 160 and can be located, for example, in the catheter 110, in an external device, in a mobile device, in a cloud-based device, or can be a stand-alone processor. In this regard, the reconstruction engine 101 can be transferable/downloaded in electronic form, over a network.

In an example, the console 160 can be any computing device, as noted herein, including software (e.g., the reconstruction engine 101) and/or hardware (e.g., the processor 161 and the memory 162), such as a general-purpose computer, with suitable front end and interface circuits for transmitting and receiving signals to and from the probe 105, as well as for controlling the other components of the system 100. For example, the front end and interface circuits include input/output (I/O) communication interfaces that enables the console 160 to receive signals from and/or transfer signals to the at least one electrode 111. The console 160 can include real-time noise reduction circuitry typically configured as a field programmable gate array (FPGA), followed by an analog-to-digital (A/D) ECG or electrocardiograph/electromyogram (EMG) signal conversion integrated circuit. The console 160 can pass the signal from an A/D ECG or EMG circuit to another processor and/or can be programmed to perform one or more functions disclosed herein.

The display 165, which can be any electronic device for the visual presentation of the biometric data, is connected to the console 160. According to an exemplary embodiment, during a procedure, the console 160 can facilitate on the display 165 a presentation of a body part rendering to the physician 115 and store data representing the body part rendering in the memory 162. For instance, maps depicting motion characteristics can be rendered/constructed based on the trajectory information sampled at a sufficient number of points in the heart 120. As an example, the display 165 can include a touchscreen that can be configured to accept inputs from the medical professional 115, in addition to presenting the body part rendering.

In some embodiments, the physician 115 can manipulate the elements of the system 100 and/or the body part rendering using one or more input devices, such as a touch pad, a mouse, a keyboard, a gesture recognition apparatus, or the like. For example, an input device can be used to change a position of the catheter 110, such that rendering is updated. Note that the display 165 can be located at a same location or a remote location, such as a separate hospital or in separate healthcare provider networks.

According to one or more embodiments, the system 100 can also obtain the biometric data using ultrasound, computed tomography (CT), MRI, or other medical imaging techniques utilizing the catheter 110 or other medical equipment. For instance, the system 100 can obtain ECG data and/or anatomical and electrical measurements of the heart 120 (e.g., the biometric data) using one or more catheters 110 or other sensors. More particularly, the console 160 can be connected, by a cable, to BS electrodes, which include adhesive skin patches affixed to the patient 125. The BS electrodes can procure/generate the biometric data in the form of the BS ECG data. For instance, the processor 161 can determine position coordinates of the catheter 110 inside the body part (e.g., the heart 120) of the patient 125. The position coordinates may be based on impedances or electromagnetic fields measured between the body surface electrodes and the electrode 111 of the catheter 110 or other electromagnetic components. Additionally, or alternatively, location pads, which generate magnetic fields used for navigation, may be located on a surface of the bed 130 and may be separate from the bed 130. The biometric data can be transmitted to the console 160 and stored in the memory 162. Alternatively, or in addition, the biometric data may be transmitted to a server, which may be local or remote, using a network as further described herein.

According to one or more exemplary embodiments, the catheter 110 may be configured to ablate tissue areas of a cardiac chamber of the heart 120. Inset 150 shows the catheter 110 in an enlarged view, inside a cardiac chamber of the heart 120. For instance, ablation electrodes, such as the at least one electrode 111, may be configured to provide energy to tissue areas of an intra-body organ (e.g., the heart 120). The energy may be thermal energy and may cause damage to the tissue area starting from the surface of the tissue area and extending into the thickness of the tissue area. The biometric data with respect to ablation procedures (e.g., ablation tissues, ablation locations, etc.) can be considered ablation data.

According to an example, with respect to obtaining the biometric data, a multi-electrode catheter (e.g., the catheter 110) can be advanced into a chamber of the heart 120. Anteroposterior (AP) and lateral fluorograms can be obtained to establish the position and orientation of each of the electrodes. ECGs can be recorded from each of the electrodes 111 in contact with a cardiac surface relative to a temporal reference, such as the onset of the P-wave in sinus rhythm from a BS ECG and/or signals from electrodes 111 of the catheter 110 placed in the coronary sinus. The system, as further disclosed herein, may differentiate between those electrodes that register electrical activity and those that do not due to absence of close proximity to the endocardial wall. After initial ECGs are recorded, the catheter may be repositioned, and fluorograms and ECGs may be recorded again. An electrical map (e.g., via cardiac mapping) can then be constructed from iterations of the process above.

Cardiac mapping can be implemented using one or more techniques. Generally, mapping of cardiac areas such as cardiac regions, tissue, veins, arteries and/or electrical pathways of the heart 120 may result in identifying problem areas such as scar tissue, arrhythmia sources (e.g., electric rotors), healthy areas, and the like. Cardiac areas may be mapped such that a visual rendering of the mapped cardiac areas is provided using a display, as further disclosed herein. Additionally, cardiac mapping (which is an example of heart imaging) may include mapping based on one or more modalities such as, but not limited to LAT, local activation velocity, an electrical activity, a topology, a bipolar mapping, a dominant frequency, or an impedance. Data (e.g., biometric data) corresponding to multiple modalities may be captured using a catheter (e.g., the catheter 110) inserted into a patient's body and may be provided for rendering at the same time or at different times based on corresponding settings and/or preferences of the physician 115.

As an example of a first technique, cardiac mapping may be implemented by sensing an electrical property of heart tissue, for example, LAT, as a function of the precise location within the heart 120. The corresponding data (e.g., biometric data) may be acquired with one or more catheters (e.g., the catheter 110) that are advanced into the heart 1120 and that have electrical and location sensors (e.g., the electrodes 111) in their distal tips. As specific examples, location and electrical activity may be initially measured on about 10 to about 20 points on the interior surface of the heart 120. These data points may be generally sufficient to generate a preliminary reconstruction or map of the cardiac surface to a satisfactory quality. The preliminary map may be combined with data taken at additional points to generate a more comprehensive map of the heart's electrical activity. In clinical settings, it is not uncommon to accumulate data at 100 or more sites (e.g., several thousand) to generate a detailed, comprehensive map of heart chamber electrical activity. The generated detailed map may then serve as the basis for deciding on a therapeutic course of action, for example, tissue ablation as described herein, to alter the propagation of the heart's electrical activity and to restore normal heart rhythm.

Further, cardiac mapping can be generated based on detection of intracardiac electrical potential fields (e.g., which is an example of IC ECG data and/or bipolar intracardiac reference signals). A non-contact technique to simultaneously acquire a large amount of cardiac electrical information may be implemented. For example, a catheter type having a distal end portion may be provided with a series of sensor electrodes distributed over its surface and connected to insulated electrical conductors for connection to signal sensing and processing means. The size and shape of the end portion may be such that the electrodes are spaced substantially away from the wall of the cardiac chamber. Intracardiac potential fields may be detected during a single cardiac beat. According to an example, the sensor electrodes may be distributed on a series of circumferences lying in planes spaced from each other. These planes may be perpendicular to the major axis of the end portion of the catheter. At least two additional electrodes may be provided adjacent at the ends of the major axis of the end portion. As a more specific example, the catheter may include four circumferences with eight electrodes spaced equiangularly on each circumference. Accordingly, in this specific implementation, the catheter may include at least 34 electrodes (32 circumferential and 2 end electrodes). As another more specific example, the catheter may include other multi-spline catheters, such as five soft flexible branches, eight radial splines, or a parallel splined pancake turner type (e.g., any of which may have a total of 42 electrodes).

As example of electrical or cardiac mapping, an electrophysiological cardiac mapping system and technique based on a non-contact and non-expanded multi-electrode catheter (e.g., the catheter 110) can be implemented. ECGs may be obtained with one or more catheters 110 having multiple electrodes (e.g., such as between 42 to 122 electrodes). According to this implementation, knowledge of the relative geometry of the probe and the endocardium can be obtained by an independent imaging modality, such as transesophageal echocardiography. After the independent imaging, non-contact electrodes may be used to measure cardiac surface potentials and construct maps therefrom (e.g., in some cases using bipolar intracardiac reference signals). This technique can include the following steps (after the independent imaging step): (a) measuring electrical potentials with a plurality of electrodes disposed on a probe positioned in the heart 120; (b) determining the geometric relationship of the probe surface and the endocardial surface and/or other reference; (c) generating a matrix of coefficients representing the geometric relationship of the probe surface and the endocardial surface; and (d) determining endocardial potentials based on the electrode potentials and the matrix of coefficients.

As another example of electrical or cardiac mapping, a technique and apparatus for mapping the electrical potential distribution of a heart chamber can be implemented. An intra-cardiac multi-electrode mapping catheter assembly can be inserted into the heart 120. The mapping catheter (e.g., the catheter 110) assembly can include a multi-electrode array with one or more integral reference electrodes (e.g., one or the electrodes 111) or a companion reference catheter.

According to one or more exemplary embodiments, the electrodes may be deployed in the form of a substantially spherical array, which may be spatially referenced to a point on the endocardial surface by the reference electrode or by the reference catheter this is brought into contact with the endocardial surface. The preferred electrode array catheter may carry a number of individual electrode sites (e.g., at least 24). Additionally, this example technique may be implemented with knowledge of the location of each of the electrode sites on the array, as well as knowledge of the cardiac geometry. These locations are preferably determined by a technique of impedance plethysmography.

In view of electrical or cardiac mapping and according to another example, the catheter 110 can be a heart mapping catheter assembly that may include an electrode array defining a number of electrode sites. The heart mapping catheter assembly can also include a lumen to accept a reference catheter having a distal tip electrode assembly that may be used to probe the heart wall. The map heart mapping catheter assembly can include a braid of insulated wires (e.g., having 24 to 64 wires in the braid), and each of the wires may be used to form electrode sites. The heart mapping catheter assembly may be readily positionable in the heart 120 to be used to acquire electrical activity information from a first set of non-contact electrode sites and/or a second set of in-contact electrode sites.

Further, according to another example, the catheter 110 that can implement mapping electrophysiological activity within the heart can include a distal tip that is adapted for delivery of a stimulating pulse for pacing the heart or an ablative electrode for ablating tissue in contact with the tip. This catheter 110 can further include at least one pair of orthogonal electrodes to generate a difference signal indicative of the local cardiac electrical activity adjacent the orthogonal electrodes.

As noted herein, the system 100 can be utilized to detect, diagnose, and/or treat cardiac conditions. In example operation, a process for measuring electrophysiologic data in a heart chamber may be implemented by the system 100. The process may include, in part, positioning a set of active and passive electrodes into the heart 120, supplying current to the active electrodes, thereby generating an electric field in the heart chamber, and measuring the electric field at the passive electrode sites. The passive electrodes are contained in an array positioned on an inflatable balloon of a balloon catheter. In preferred embodiments, the array is said to have from 60 to 64 electrodes.

As another example operation, cardiac mapping may be implemented by the system 100 using one or more ultrasound transducers. The ultrasound transducers may be inserted into a patient's heart 120 and may collect a plurality of ultrasound slices (e.g., two dimensional or three-dimensional slices) at various locations and orientations within the heart 120. The location and orientation of a given ultrasound transducer may be known and the collected ultrasound slices may be stored such that they can be displayed at a later time. One or more ultrasound slices corresponding to the position of the probe 105 (e.g., a treatment catheter shown as catheter 110) at the later time may be displayed and the probe 105 may be overlaid onto the one or more ultrasound slices.

In view of the system 100, it is noted that cardiac arrhythmias, including atrial arrhythmias, may be of a multiwavelet reentrant type, characterized by multiple asynchronous loops of electrical impulses that are scattered about the atrial chamber and are often self-propagating (e.g., another example of the IC ECG data). Alternatively, or in addition to the multiwavelet reentrant type, cardiac arrhythmias may also have a focal origin, such as when an isolated region of tissue in an atrium fires autonomously in a rapid, repetitive fashion (e.g., another example of the IC ECG data). Ventricular tachycardia (V-tach or VT) is a tachycardia, or fast heart rhythm that originates in one of the ventricles of the heart. This is a potentially life-threatening arrhythmia because it may lead to ventricular fibrillation and sudden death.

For example, aFib occurs when the normal electrical impulses (e.g., another example of the IC ECG data) generated by the sinoatrial node are overwhelmed by disorganized electrical impulses (e.g., signal interference) that originate in the atria veins and PVs causing irregular impulses to be conducted to the ventricles. An irregular heartbeat results and may last from minutes to weeks, or even years. aFib is often a chronic condition that leads to a small increase in the risk of death often due to strokes. A line of treatment for aFib is medication that either slows the heart rate or revert the heart rhythm back to normal. Additionally, persons with aFib are often given anticoagulants to protect them from the risk of stroke. The use of such anticoagulants comes with its own risk of internal bleeding. In some patients, medication is not sufficient and their aFib is deemed to be drug-refractory, i.e., untreatable with standard pharmacological interventions. Synchronized electrical cardioversion may also be used to convert aFib to a normal heart rhythm. Alternatively, aFib patients are treated by catheter ablation.

A catheter ablation-based treatment may include mapping the electrical properties of heart tissue, especially the endocardium and the heart volume, and selectively ablating cardiac tissue by application of energy. Electrical or cardiac mapping (e.g., implemented by any electrophysiological cardiac mapping system and technique described herein) includes creating a map of electrical potentials (e.g., a voltage map) of the wave propagation along the heart tissue or a map of arrival times (e.g., a LAT map) to various tissue located points. Electrical or cardiac mapping (e.g., a cardiac map) may be used for detecting local heart tissue dysfunction. Ablations, such as those based on cardiac mapping, can cease or modify the propagation of unwanted electrical signals from one portion of the heart 120 to another.

The ablation process damages the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. Another example of an energy delivery technique includes irreversible electroporation (IRE), which provides high electric fields that damage cell membranes. In a two-step procedure (e.g., mapping followed by ablation) electrical activity at points within the heart 120 is typically sensed and measured by advancing the catheter 110 containing one or more electrical sensors (e.g., electrodes 111) into the heart 120 and obtaining/acquiring data at a multiplicity of points (e.g., as biometric data generally, or as ECG data specifically). This ECG data is then utilized to select the endocardial target areas, at which ablation is to be performed.

Cardiac ablation and other cardiac electrophysiological procedures have become increasingly complex as clinicians treat challenging conditions such as atrial fibrillation and ventricular tachycardia. The treatment of complex arrhythmias can now rely on the use of three-dimensional (3D) mapping systems to reconstruct the anatomy of the heart chamber of interest. In this regard, the reconstruction engine 101 employed by the system 100 herein manipulates and evaluates the biometric data generally, or the ECG data specifically, to produce improved tissue data that enables more accurate diagnosis, images, scans, and/or maps for treating an abnormal heartbeat or arrhythmia. For example, cardiologists rely upon software, such as the Complex Fractionated Atrial Electrograms (CFAE) module of the CARTO® 3 3D mapping system, produced by Biosense Webster, Inc. (Diamond Bar, Calif.), to generate and analyze ECG data. The reconstruction engine 101 of the system 100 enhances this software to generate and analyze the improved biometric data, which further provide multiple pieces of information regarding electrophysiological properties of the heart 120 (including the scar tissue) that represent cardiac substrates (anatomical and functional) of aFib.

Accordingly, the system 100 can implement a 3D mapping system, such as CARTO® 3 3D mapping system, to localize the potential arrhythmogenic substrate of the cardiomyopathy in terms of abnormal ECG detection. The substrate linked to these cardiac conditions is related to the presence of fragmented and prolonged ECGs in the endocardial and/or epicardial layers of the ventricular chambers (right and left). For instance, areas of low or medium voltage may exhibit ECG fragmentation and prolonged activities. Further, during sinus rhythm, areas of low or medium voltage may corresponds to a critical isthmus identified during sustained and organized ventricular arrhythmias (e.g., applies to non-tolerated ventricular tachycardias, as well as in the atria). In general, abnormal tissue is characterized by low-voltage ECGs. However, initial clinical experience in endo-epicardial mapping indicates that areas of low-voltage are not always present as the sole arrhythmogenic mechanism in such patients. In fact, areas of low or medium voltage may exhibit ECG fragmentation and prolonged activities during sinus rhythm, which corresponds to the critical isthmus identified during sustained and organized ventricular arrhythmias, e.g., applies only to non-tolerated ventricular tachycardias. Moreover, in many cases, ECG fragmentation and prolonged activities are observed in the regions showing a normal or near-normal voltage amplitude (>1-1.5 mV). Although the latter areas may be evaluated according to the voltage amplitude, they cannot be considered as normal according to the intracardiac signal, thus representing a true arrhythmogenic substrate. The 3D mapping may be able to localize the arrhythmogenic substrate on the endocardial and/or epicardial layer of the right/left ventricle, which may vary in distribution according to the extension of the main disease.

As another example operation, cardiac mapping may be implemented by the system 100 using one or more multiple-electrode catheters (e.g., the catheter 110). Multiple-electrode catheters are used to stimulate and map electrical activity in the heart 120 and to ablate sites of aberrant electrical activity. In use, the multiple-electrode catheter is inserted into a major vein or artery, e.g., femoral vein, and then guided into the chamber of the heart 120 of concern. A typical ablation procedure involves the insertion of the catheter 110 having at least one electrode 111 at its distal end, into a heart chamber. A reference electrode is provided, taped to the skin of the patient or by means of a second catheter that is positioned in or near the heart or selected from one or the other electrodes 111 of the catheter 110. Radio frequency (RF) current is applied to a tip electrode 111 of the ablating catheter 110, and current flows through the media that surrounds it (e.g., blood and tissue) toward the reference electrode. The distribution of current depends on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive. During this process, heating of the tip electrode 111 also occurs as a result of conduction from the heated tissue to the electrode itself. If the electrode temperature becomes sufficiently high, possibly above 60 degrees Celsius, a thin transparent coating of dehydrated blood protein can form on the surface of the electrode 111. If the temperature continues to rise, this dehydrated layer can become progressively thicker resulting in blood coagulation on the electrode surface. Because dehydrated biological material has a higher electrical resistance than endocardial tissue, impedance to the flow of electrical energy into the tissue also increases. If the impedance increases sufficiently, an impedance rise occurs, and the catheter 110 must be removed from the body and the tip electrode 111 cleaned.

Figure 2:
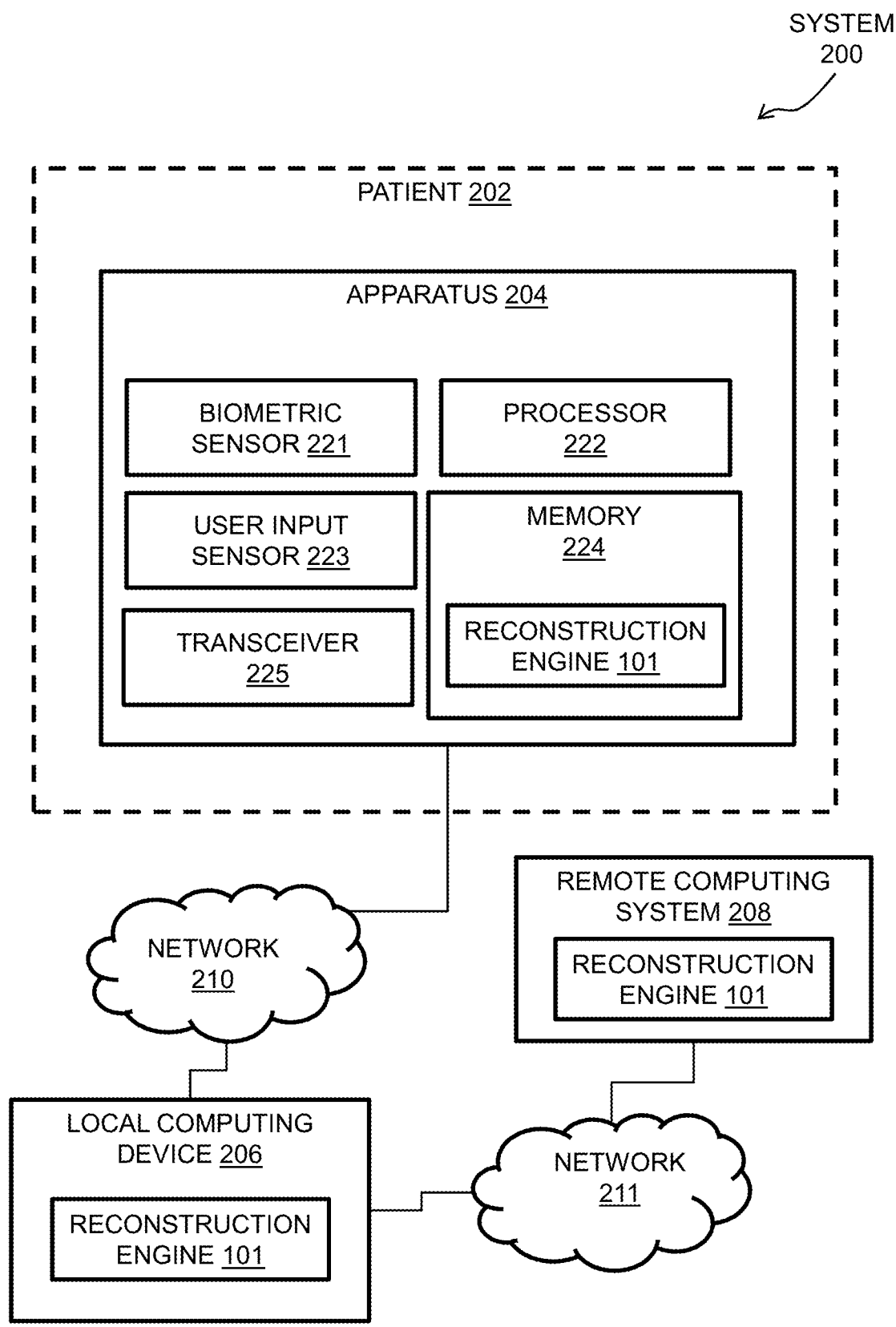
FIG. 2 illustrates a block diagram of an example system for an anatomically correct reconstruction of an atrium according to one or more embodiments.

Turning now to FIG. 2, a diagram of a system 200 in which one or more features of the disclosure subject matter can be implemented is illustrated according to one or more exemplary embodiments. The system 200 includes, in relation to a patient 202 (e.g., an example of the patient 125 of FIG. 1), an apparatus 204, a local computing device 206, a remote computing system 208, a first network 210, and a second network 211. Further, the apparatus 204 can include a biometric sensor 221 (e.g., an example of the catheter 110 of FIG. 1), a processor 222, a user input (UI) sensor 223, a memory 224, and a transceiver 225. Note that the reconstruction engine 101 of FIG. 1 is reused in FIG. 2 for ease of explanation and brevity.

According to an embodiment, the apparatus 204 can be an example of the system 100 of FIG. 1, where the apparatus 204 can include both components that are internal to the patient and components that are external to the patient. According to another embodiment, the apparatus 204 can be an apparatus that is external to the patient 202 that includes an attachable patch (e.g., that attaches to a patient's skin). According to another embodiment, the apparatus 204 can be internal to a body of the patient 202 (e.g., subcutaneously implantable), where the apparatus 204 can be inserted into the patient 202 via any applicable manner including orally injecting, surgical insertion via a vein or artery, an endoscopic procedure, or a laparoscopic procedure. According to an embodiment, while a single apparatus 204 is shown in FIG. 2, example systems may include a plurality of apparatuses.

Accordingly, the apparatus 204, the local computing device 206, and/or the remote computing system 208 can be programed to execute computer instructions with respect the reconstruction engine 101. As an example, the memory 223 stores these instructions for execution by the processor 222 so that the apparatus 204 can receive and process the biometric data via the biometric sensor 201. In this way, the processor 222 and the memory 223 are representative of processors and memories of the local computing device 206 and/or the remote computing system 208.

The apparatus 204, local computing device 206, and/or the remote computing system 208 can be any combination of software and/or hardware that individually or collectively store, execute, and implement the reconstruction engine 101 and functions thereof. Further, the apparatus 204, local computing device 206, and/or the remote computing system 208 can be an electronic, computer framework comprising and/or employing any number and combination of computing device and networks utilizing various communication technologies, as described herein. The apparatus 204, local computing device 206, and/or the remote computing system 208 can be easily scalable, extensible, and modular, with the ability to change to different services or reconfigure some features independently of others.

The networks 210 and 211 can be a wired network, a wireless network, or include one or more wired and wireless networks. According to an embodiment, the network 210 is an example of a short-range network (e.g., local area network (LAN), or personal area network (PAN)). Information can be sent, via the network 210, between the apparatus 204 and the local computing device 206 using any one of various short-range wireless communication protocols, such as Bluetooth, Wi-Fi, Zigbee, Z-Wave, near field communications (NFC), ultra-band, Zigbee, or infrared (IR). Further, the network 211 is an example of one or more of an Intranet, a local area network (LAN), a wide area network (WAN), a metropolitan area network (MAN), a direct connection or series of connections, a cellular telephone network, or any other network or medium capable of facilitating communication between the local computing device 206 and the remote computing system 208. Information can be sent, via the network 211, using any one of various long-range wireless communication protocols (e.g., TCP/IP, HTTP, 3G, 4G/LTE, or 5G/New Radio). Note that for either network 210 and 211 wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

In operation, the apparatus 204 can continually or periodically obtain, monitor, store, process, and communicate via network 210 the biometric data associated with the patient 202. Further, the apparatus 204, local computing device 206, and/the remote computing system 208 are in communication through the networks 210 and 211 (e.g., the local computing device 206 can be configured as a gateway between the apparatus 204 and the remote computing system 208). For instance, the apparatus 204 can be an example of the system 100 of FIG. 1 configured to communicate with the local computing device 206 via the network 210. The local computing device 206 can be, for example, a stationary/standalone device, a base station, a desktop/laptop computer, a smart phone, a smartwatch, a tablet, or other device configured to communicate with other devices via networks 211 and 210. The remote computing system 208, implemented as a physical server on or connected to the network 211 or as a virtual server in a public cloud computing provider (e.g., Amazon Web Services (AWS)®) of the network 211, can be configured to communicate with the local computing device 206 via the network 211. Thus, the biometric data associated with the patient 202 can be communicated throughout the system 200.

Elements of the apparatus 204 are now described. The biometric sensor 221 may include, for example, one or more transducers configured to convert one or more environmental conditions into an electrical signal, such that different types of biometric data are observed/obtained/acquired. For example, the biometric sensor 221 can include one or more of an electrode (e.g., the electrode 111 of FIG. 1), a temperature sensor (e.g., thermocouple), a blood pressure sensor, a blood glucose sensor, a blood oxygen sensor, a pH sensor, an accelerometer, and a microphone.

The processor 222, in executing the reconstruction engine 101, can be configured to receive, process, and manage the biometric data acquired by the biometric sensor 221, and communicate the biometric data to the memory 224 for storage and/or across the network 210 via the transceiver 225. Biometric data from one or more other apparatuses 204 can also be received by the processor 222 through the transceiver 225. Also, as described in more detail herein, the processor 222 may be configured to respond selectively to different tapping patterns (e.g., a single tap or a double tap) received from the UI sensor 223, such that different tasks of a patch (e.g., acquisition, storing, or transmission of data) can be activated based on the detected pattern. In some embodiments, the processor 222 can generate audible feedback with respect to detecting a gesture.

The UI sensor 223 includes, for example, a piezoelectric sensor or a capacitive sensor configured to receive a user input, such as a tapping or touching. For example, the UI sensor 223 can be controlled to implement a capacitive coupling, in response to tapping or touching a surface of the apparatus 204 by the patient 202. Gesture recognition may be implemented via any one of various capacitive types, such as resistive capacitive, surface capacitive, projected capacitive, surface acoustic wave, piezoelectric and infrared touching. Capacitive sensors may be disposed at a small area or over a length of the surface, such that the tapping or touching of the surface activates the monitoring device.

The memory 224 is any non-transitory tangible media, such as magnetic, optical, or electronic memory (e.g., any suitable volatile and/or non-volatile memory, such as random-access memory or a hard disk drive). The memory 224 stores the computer instructions for execution by the processor 222.

The transceiver 225 may include a separate transmitter and a separate receiver. Alternatively, the transceiver 225 may include a transmitter and receiver integrated into a single device.

In operation, the apparatus 204, utilizing the reconstruction engine 101, observes/obtains the biometric data of the patient 202 via the biometric sensor 221, stores the biometric data in the memory, and shares this biometric data across the system 200 via the transceiver 225. The reconstruction engine 101 can then utilize models (e.g., the parametric model), algorithms (e.g., the mFAM algorithm), neural networks, machine learning, and/or artificial intelligence to generate and provide the isosurface to physician, to reduce processing loads for the system 100, and to transform operations the system 100 to more accurate mapping machines.

Figure 3:
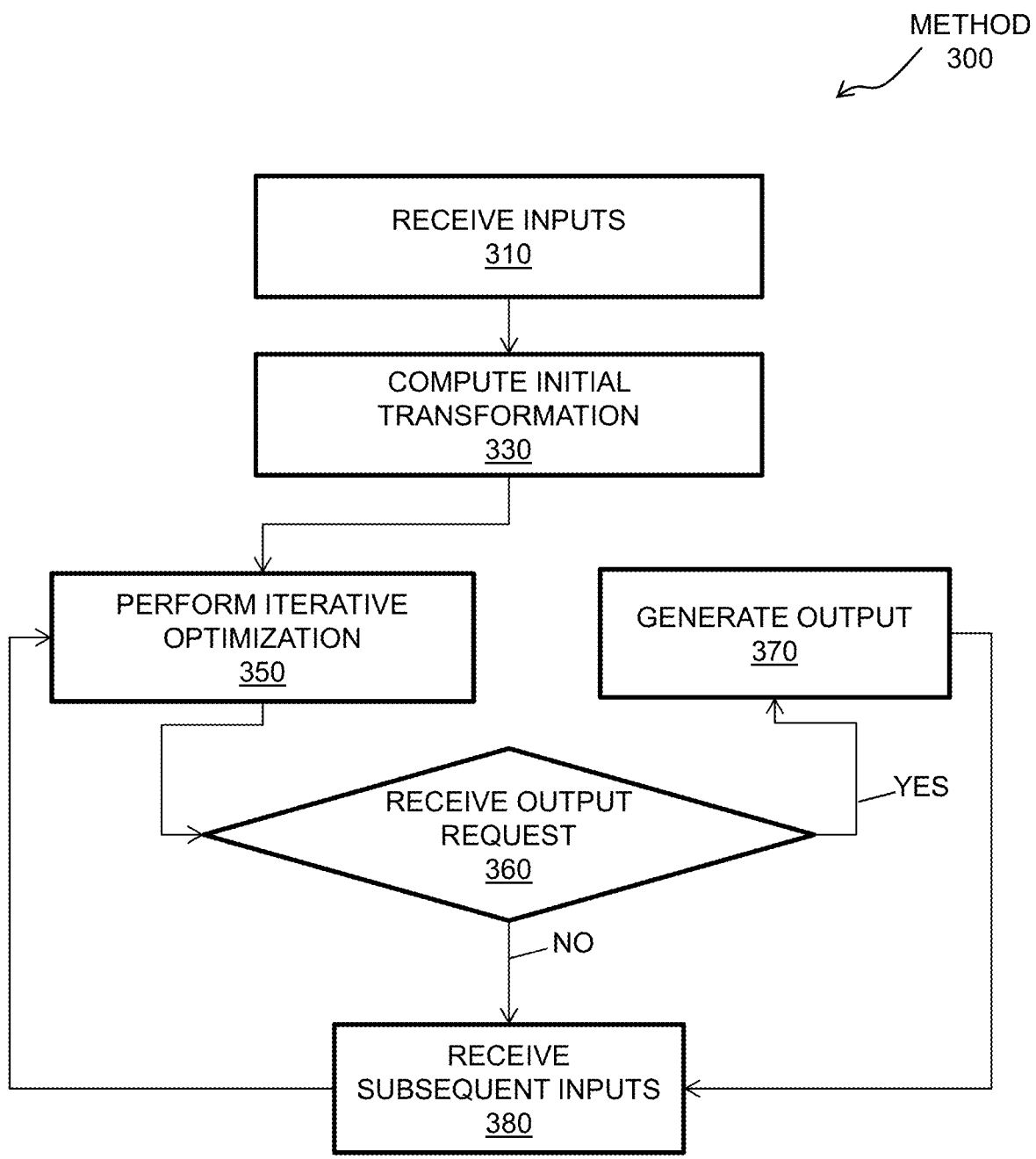
FIG. 3 illustrates an exemplary method according to one or more embodiments.

Turning now to FIG. 3, a method 300 (e.g., performed by the reconstruction engine 101 of FIG. 1 and/or of FIG. 2) is illustrated according to one or more exemplary embodiments. The method 300 addresses the shortcomings of FAM algorithms and standard simple meshing methods by providing a multi-step manipulation of point cloud data and the like that enables an improved electrophysiology understanding through the isosurface. The method 300 is described with respect to the left atrium by way of example and ease of explanation. It should be understood that the method described herein can also be applied to any anatomical structure, body part, organ, or portion thereof.

The method begins at block 310, where the reconstruction engine 101 receives inputs. The inputs, generally, represent what the reconstruction engine 101 knows about the left atrium according to operation of the catheter 110 and can include points with associated user annotations (e.g., point cloud data and/or specific known points acquired by the catheter 110 as it is maneuvered within the left atrium).

According to one or more embodiments, the inputs can include, but are not limited to catheter points (e.g., coordinates, force magnitude and direction, etc.) and anatomical tags for points from right and left sides of the left atrium, as well as datasets of other instances of the left atrium (e.g., values from other mappings) and scoring. According to one or more embodiments, the inputs can also include (e.g., whether regular and/or preferred "magnet" points) multiple layers of rich information that is used to generate a more accurate reconstruction (e.g., all information is accounted for in a cost function). By way of example, the inputs can include general catheter points (e.g., located somewhere inside an atrium, up to noise/artifacts), points with force magnitude in given window (e.g., located on a surface of the atrium), points with high-force magnitude (e.g., located on or outside the surface, which may be referred to as tenting), points with force orientation data (e.g., provide information on orientation of the surface in the vicinity), and ultrasound contour points (e.g., located on the surface).

At block 330, the reconstruction engine 101 computes an initial transformation (e.g., an initial transformation computation). According to one or more embodiments, the initial transformation computation can be an initialization of a model fitting process where the reconstruction engine 101 anatomically tags points from both left (LIPV, LSPV) and right (RSPV, RIPV, or septum) sides of the atrium. Further, an initial template model is then transformed such that its corresponding anatomical features (PV centers and/or septum) are optimally matched to the known tagged locations. The location of the tags of tagged PV pairs from the same side (RI and RS, or LI and LS), are shifted towards one another. The reconstruction engine 101 can also compute an optimal similarity transformation using the pairs of known points (model features and centers of tagged points). The transformation is then applied by modifying the bounding sphere model parameters.

The initial transformation can include a selection operation with respect to parameters and a parametric model so that a structure/model complies with the received inputs of block 330 (e.g., a normal left atrium). According to one or more embodiments, parameters are chosen by the reconstruction engine 101 automatically and/or by user input. Further, the mFAM algorithm to generate/define a parametric model according to the chosen parameters. For instance, the mFAM algorithm selects the parametric model that best fits all the available information, i.e., the inputs of block 330: locations of points, contact force magnitude and direction, user tagging of anatomical parts, and a statistical score (as described herein) measuring anatomical correctness of the parametric model. As indicated herein, the parametric model can be a fixed model representing a shape of the left atrium or a substructure thereof.

At block 350, the reconstruction engine 101 executes an iterative optimization. The iterative optimization is executed for/to blending of the parametric model with the received inputs of block 310. According to one or more embodiments, the iterative optimization can be used for, but is not limited to, computing cost and constraint functions, computing cost and constraint derivatives, updating model parameters (e.g., sequential quadratic programming updates), updating input data, updating optimization hyperparameters, and/or updating tube cuts (e.g., every n iterations). Note that the operations of block 350 can include machine learning and artificial intelligence operations with respect to predicting user interactions, tags, map manipulations, etc., such that the reconstruction engine 101 can perform iterative optimizations automatically. The structure of these machine learning and artificial intelligence aspects of the reconstruction engine 101 are discussed herein with respect to FIGS. 4 and 5.

In an example, the reconstruction engine 101 uses the mFAM algorithm to construct a statistical prior based on the selected parametric model. The reconstruction engine 101 uses the mFAM algorithm to further fit/apply the parametric model to point cloud data and the statistical prior to produce an isosurface of the substructure shape (e.g., the mFAM algorithm results in an anatomically correct reconstruction). The isosurface can be stored for later use by the reconstruction engine 100.

At decision block 360, the reconstruction engine 101 determines whether an output request has been received. For instance, a GUI of the reconstruction engine 101 can receive one or more user inputs directing the reconstruction engine 101 to provide the isosurface of block 340 or other output. Note that the isosurface is the improved, anatomically correct atrial anatomy map using as few data points as possible as described herein (e.g., a minimum number of point cloud data). If an output request has been received, the method 300 advances to block 370 via the YES arrow. If an output request has been not received, the method 300 advances to block 380 via the NO arrow.

At block 370, the reconstruction engine 101 generates an output (e.g., the isosurface). According to one or more embodiments, the outputs can include, but are not limited to the isosurface, other three dimensional mesh renderings, anatomical mesh colorings (e.g., for a PV, body section, ridges, etc.). In an example, the reconstruction engine 101 then displays the isosurface for use by a physician during ablation (e.g., during an ablation procedure on a display). One or more advantages, technical effects, and/or benefits of the method 300 include generating/providing the isosurface (e.g., the improved, anatomically correct atrial anatomy map of left atrium). In some cases the method 300 can end after generating the output. In other cases the method can advance to block 380.

At block 380, the reconstruction engine 101 receives subsequent inputs. According to one or more embodiments, the subsequent inputs can include, but are not limited to catheter points, preferred "magnet" points (e.g., ablations, acquired points, user defined points, etc.), optional/subsequent anatomical tags (e.g., of the left interior pulmonary vein (LIPV), appendage, ridge, etc.), and optional/subsequent user edits (e.g., PV cuts, ridge and PV centerline constraints, etc.) to the output of block 370. The preferred "magnet" points can be user driven and can further defined as point that a user knows where the catheter 110 is located with associated granular information definition (e.g., ablation points that constrain a surface while retaining overall anatomical correctness).

Note that the method 300 can return to block 350, when the subsequent inputs are received to further execute iterative optimizations with respect to the subsequent inputs. In this regard, the isosurface can adapt smoothly to new points as these points are mapped by the catheter 110, and the reconstruction engine 101 can enable assignment of the preferred "magnet" points.

Otherwise, the method 300 can end.

Figure 4:
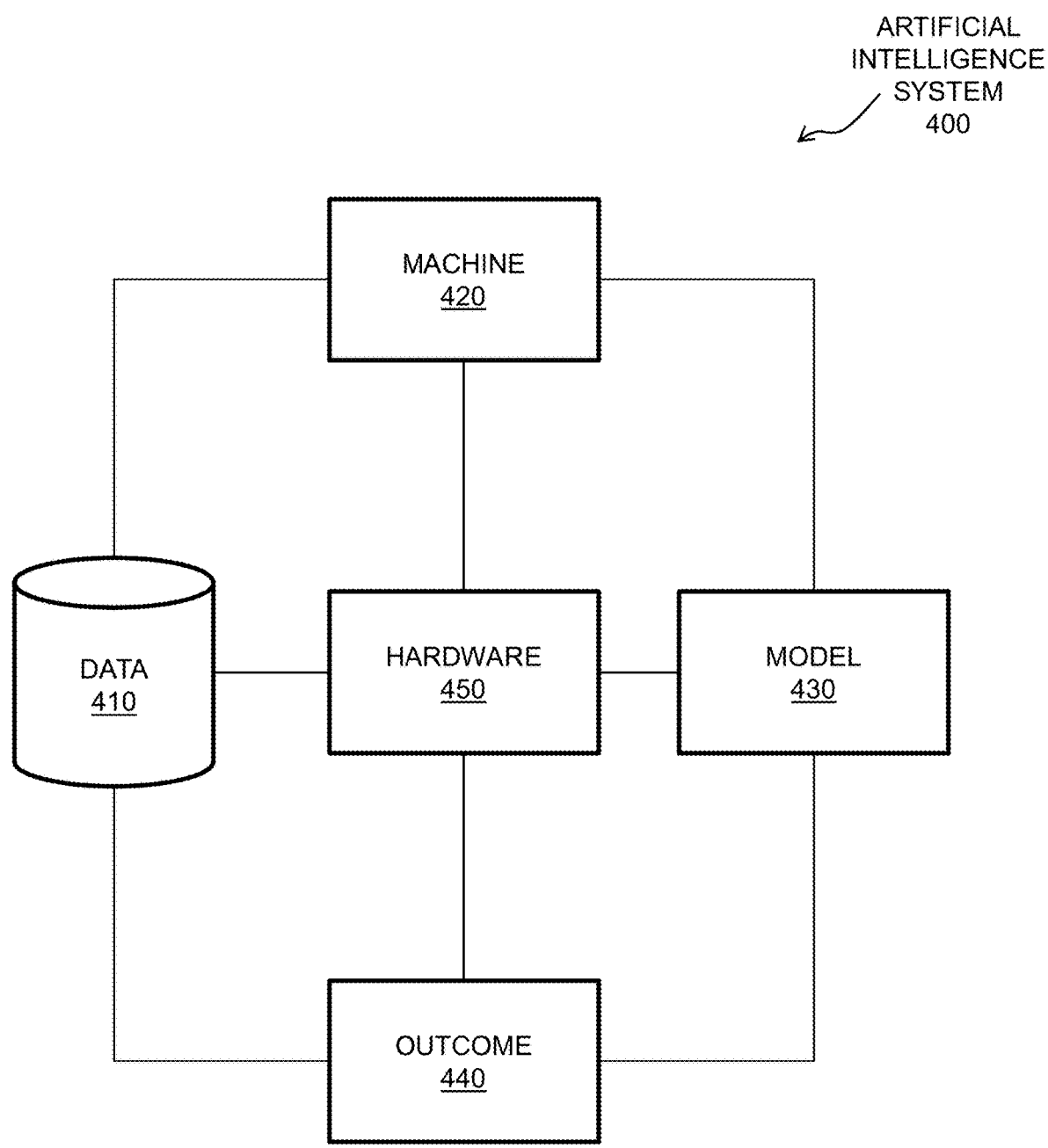
FIG. 4 illustrates a graphical depiction of an artificial intelligence system according to one or more exemplary embodiments.
Figure 5:
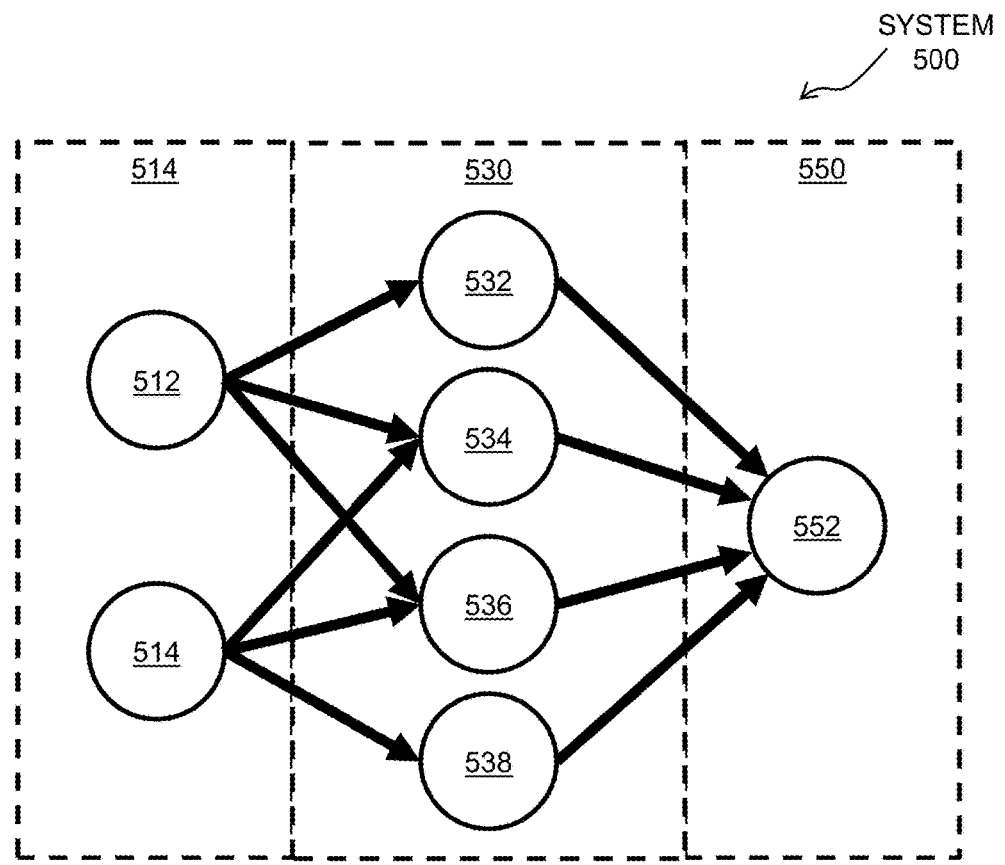
FIG. 5 illustrates an example of a neural network and a block diagram of a method performed in the neural network according to one or more embodiments.
Figure 5:
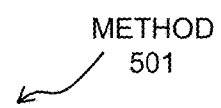

FIG. 4 illustrates a graphical depiction of an artificial intelligence system 400 according to one or more embodiments. The artificial intelligence system 400 includes data 410 (e.g., biometric data), a machine 420, a model 430, an outcome 440, and (underlying) hardware 450. The description of FIGS. 4-5 is made with reference to FIGS. 1-3 for ease of understanding where appropriate. For example, the machine 410, the model 430, and the hardware 450 can represent aspects of the reconstruction engine 101 of FIGS. 1-2 (e.g., machine learning and/or an artificial intelligence algorithm therein), while the hardware 450 can also represent the catheter 110 of FIG. 1, the console 160 of FIG. 1, and/o the apparatus 204 of FIG. 2. In general, the machine learning and/or the artificial intelligence algorithms of the artificial intelligence system 400 (e.g., as implemented by the reconstruction engine 101 of FIGS. 1-2) operate with respect to the hardware 450, using the data 410, to train the machine 420, build the model 430, and predict the outcomes 440.

For instance, the machine 420 operates as the controller or data collection associated with the hardware 450 and/or is associated therewith. The data 410 (e.g., the biometric data as described herein) can be on-going data or output data associated with the hardware 450. The data 410 can also include currently collected data, historical data, or other data from the hardware 450; can include measurements during a surgical procedure and may be associated with an outcome of the surgical procedure; can include a temperature of the heart 140 of FIG. 1 collected and correlated with an outcome of a heart procedure; and can be related to the hardware 450. The data 410 can be divided by the machine 420 into one or more subsets.

Further, the machine 420 trains, such as with respect to the hardware 450. This training can also include an analysis and correlation of the data 410 collected. For example, in the case of the heart, the data 410 of temperature and outcome may be trained to determine if a correlation or link exists between the temperature of the heart 140 of FIG. 1 during the heart procedure and the outcome. In accordance with another embodiment, training the machine 420 can include self-training by the reconstruction engine 101 of FIG. 1 utilizing the one or more subsets. In this regard, the reconstruction engine 101 of FIG. 1 learns to detect case classifications on a point by point basis.

Moreover, the model 430 is built on the data 410 associated with the hardware 450. Building the model 430 can include physical hardware or software modeling, algorithmic modeling, and/or the like that seeks to represent the data 410 (or subsets thereof) that has been collected and trained. In some aspects, building of the model 430 is part of self-training operations by the machine 420. The model 430 can be configured to model the operation of hardware 450 and model the data 410 collected from the hardware 450 to predict the outcome 440 achieved by the hardware 450. Predicting the outcomes 440 (of the model 430 associated with the hardware 450) can utilize a trained model 430. For example and to increase understanding of the disclosure, in the case of the heart, if the temperature during the procedure that is between 36.5 degrees Celsius and 37.89 degrees Celsius (i.e., 97.7 degrees Fahrenheit and 100.2 degrees Fahrenheit) produces a positive result from the heart procedure, the outcome 440 can be predicted in a given procedure using these temperatures. Thus, using the outcome 440 that is predicted, the machine 420, the model 430, and the hardware 450 can be configured accordingly.

Thus, for the artificial intelligence system 400 to operate with respect to the hardware 450, using the data 410, to train the machine 420, build the model 430, and predict the outcomes 440, the machine learning and/or the artificial intelligence algorithms therein can include neural networks. In general, a neural network is a network or circuit of neurons, or in a modern sense, an artificial neural network (ANN), composed of artificial neurons or nodes or cells.

For example, an ANN involves a network of processing elements (artificial neurons) which can exhibit complex global behavior, determined by the connections between the processing elements and element parameters. These connections of the network or circuit of neurons are modeled as weights. A positive weight reflects an excitatory connection, while negative values mean inhibitory connections. Inputs are modified by a weight and summed using a linear combination. An activation function may control the amplitude of the output. For example, an acceptable range of output is usually between 0 and 1, or it could be −1 and 1. In most cases, the ANN is an adaptive system that changes its structure based on external or internal information that flows through the network.

In more practical terms, neural networks are non-linear statistical data modeling or decision-making tools that can be used to model complex relationships between inputs and outputs or to find patterns in data. Thus, ANNs may be used for predictive modeling and adaptive control applications, while being trained via a dataset. Note that self-learning resulting from experience can occur within ANNs, which can derive conclusions from a complex and seemingly unrelated set of information. The utility of artificial neural network models lies in the fact that they can be used to infer a function from observations and also to use it. Unsupervised neural networks can also be used to learn representations of the input that capture the salient characteristics of the input distribution, and more recently, deep learning algorithms, which can implicitly learn the distribution function of the observed data. Learning in neural networks is particularly useful in applications where the complexity of the data (e.g., the biometric data) or task (e.g., monitoring, diagnosing, and treating any number of various diseases) makes the design of such functions by hand impractical.

Neural networks can be used in different fields. Thus, for the artificial intelligence system 400, the machine learning and/or the artificial intelligence algorithms therein can include neural networks that are divided generally according to tasks to which they are applied. These divisions tend to fall within the following categories: regression analysis (e.g., function approximation) including time series prediction and modeling; classification including pattern and sequence recognition; novelty detection and sequential decision making; data processing including filtering; clustering; blind signal separation, and compression. For example, Application areas of ANNs include nonlinear system identification and control (vehicle control, process control), game-playing and decision making (backgammon, chess, racing), pattern recognition (radar systems, face identification, object recognition), sequence recognition (gesture, speech, handwritten text recognition), medical diagnosis and treatment, financial applications, data mining (or knowledge discovery in databases, "KDD"), visualization and e-mail spam filtering. For example, it is possible to create a semantic profile of patient biometric data emerging from medical procedures.

According to one or more embodiments, the neural network can implement a long short-term memory neural network architecture, a convolutional neural network (CNN) architecture, or other the like. The neural network can be configurable with respect to a number of layers, a number of connections (e.g., encoder/decoder connections), a regularization technique (e.g., dropout); and an optimization feature.

The long short-term memory neural network architecture includes feedback connections and can process single data points (e.g., such as images), along with entire sequences of data (e.g., such as speech or video). A unit of the long short-term memory neural network architecture can be composed of a cell, an input gate, an output gate, and a forget gate, where the cell remembers values over arbitrary time intervals and the gates regulate a flow of information into and out of the cell.

The CNN architecture is a shared-weight architecture with translation invariance characteristics where each neuron in one layer is connected to all neurons in the next layer. The regularization technique of the CNN architecture can take advantage of the hierarchical pattern in data and assemble more complex patterns using smaller and simpler patterns. If the neural network implements the CNN architecture, other configurable aspects of the architecture can include a number of filters at each stage, kernel size, a number of kernels per layer.

Turning now to FIG. 5, an example of a neural network 500 and a block diagram of a method 501 performed in the neural network 500 are shown according to one or more embodiments. The neural network 500 operates to support implementation of the machine learning and/or the artificial intelligence algorithms (e.g., as implemented by the reconstruction engine 101 of FIGS. 1-2) described herein. The neural network 500 can be implemented in hardware, such as the machine 420 and/or the hardware 450 of FIG. 4. As indicated herein, the description of FIGS. 4-5 is made with reference to FIGS. 1-3 for ease of understanding where appropriate.

In an example operation, the reconstruction engine 101 of FIG. 1 includes collecting the data 410 from the hardware 450. In the neural network 500, an input layer 510 is represented by a plurality of inputs (e.g., inputs 512 and 514 of FIG. 5). With respect to block 520 of the method 501, the input layer 510 receives the inputs 512 and 514. The inputs 512 and 514 can include biometric data. For example, the collecting of the data 410 can be an aggregation of biometric data (e.g., BS ECG data, IC ECG data, and ablation data, along with catheter electrode position data), from one or more procedure recordings of the hardware 450 into a dataset (as represented by the data 410).

At block 525 of the method 501, the neural network 500 encodes the inputs 512 and 514 utilizing any portion of the data 410 (e.g., the dataset and predictions produced by the artificial intelligence system 400) to produce a latent representation or data coding. The latent representation includes one or more intermediary data representations derived from the plurality of inputs. According to one or more embodiments, the latent representation is generated by an element-wise activation function (e.g., a sigmoid function or a rectified linear unit) of the reconstruction engine 101 of FIG. 1. As shown in FIG. 5, the inputs 512 and 514 are provided to a hidden layer 530 depicted as including nodes 532, 534, 536, and 538. The neural network 500 performs the processing via the hidden layer 530 of the nodes 532, 534, 536, and 538 to exhibit complex global behavior, determined by the connections between the processing elements and element parameters. Thus, the transition between layers 510 and 530 can be considered an encoder stage that takes the inputs 512 and 514 and transfers it to a deep neural network (within layer 530) to learn some smaller representation of the input (e.g., a resulting the latent representation).

The deep neural network can be a CNN, a long short-term memory neural network, a fully connected neural network, or combination thereof. The inputs 512 and 514 can be intracardiac ECG, body surface ECG, or intracardiac ECG and body surface ECG. This encoding provides a dimensionality reduction of the inputs 512 and 514. Dimensionality reduction is a process of reducing the number of random variables (of the inputs 512 and 514) under consideration by obtaining a set of principal variables. For instance, dimensionality reduction can be a feature extraction that transforms data (e.g., the inputs 512 and 514) from a high-dimensional space (e.g., more than 10 dimensions) to a lower-dimensional space (e.g., 2-3 dimensions). The technical effects and benefits of dimensionality reduction include reducing time and storage space requirements for the data 410, improving visualization of the data 410, and improving parameter interpretation for machine learning. This data transformation can be linear or nonlinear. The operations of receiving (block 520) and encoding (block 525) can be considered a data preparation portion of the multi-step data manipulation by the reconstruction engine 101.

At block 545 of the method 510, the neural network 500 decodes the latent representation. The decoding stage takes the encoder output (e.g., the resulting the latent representation) and attempts to reconstruct some form of the inputs 512 and 514 using another deep neural network. In this regard, the nodes 532, 534, 536, and 538 are combined to produce in the output layer 550 an output 552, as shown in block 560 of the method 510. That is, the output layer 590 reconstructs the inputs 512 and 514 on a reduced dimension but without the signal interferences, signal artifacts, and signal noise. Examples of the output 552 include cleaned biometric data (e.g., clean/denoised version of IC ECG data or the like). The technical effects and benefits of the cleaned biometric data include enabling more accurate monitor, diagnosis, and treatment any number of various diseases.

Figure 6:
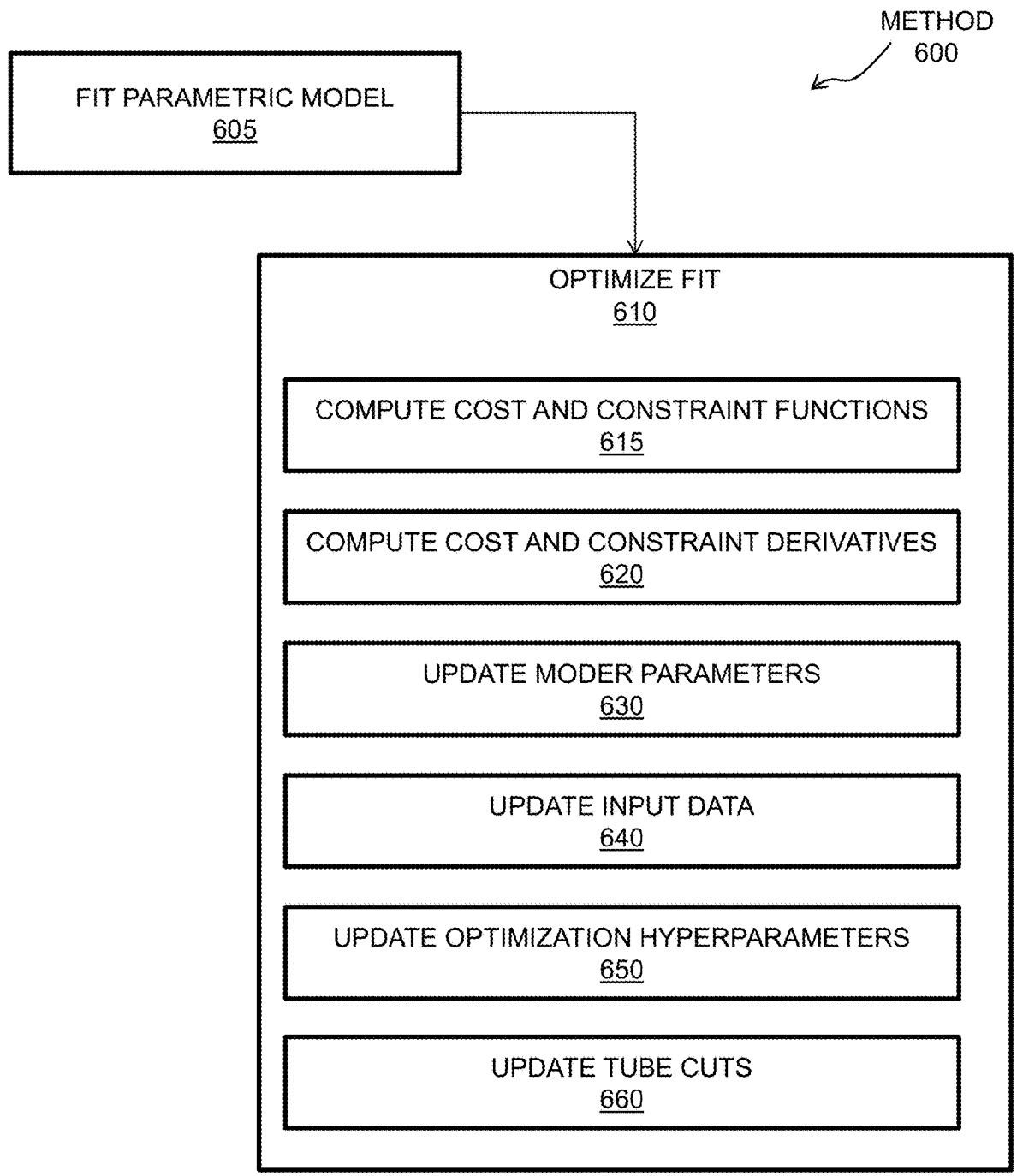
FIG. 6 illustrates an exemplary method according to one or more exemplary embodiments.

Turning now to FIG. 6, a method 600 is illustrated according to one or more embodiments. The method 600 demonstrates, in general, one or more operations of the reconstruction engine 101 that implement an optimization in which model parameters that best fit data and prior statistical knowledge are estimated in an iterative process.

At block 605, a parametric model (e.g., statistical model) is fitted to data by minimizing an objective function, subject to a set of constraints. In an example, the reconstruction engine 101 defines a parametric model representing a three dimensional anatomical shape (e.g., an atrium shape) and a field formulae for various anatomical features of the atrium shape. The reconstruction engine 101 further constructs a statistical prior on features of the atrium shape, on interrelationships thereof, parameters of the atrium shape, and/or other coordinate transformations, by statistical analysis of a dataset of ground truth left atria shapes (e.g., point cloud data for the atrium shape). Note that a field contribution of each anatomical part at any given point is computed by applying a field formula to the transformed point coordinates. Atrium shape, coordinate transformations, and field formulae are further described herein. According to one or more embodiments, the parametric model is precomputed and, in the fit process, only deviations are calculated as cost. In an example, the parametric model can be precomputed by the reconstruction engine and the mFAM algorithm. It should be understood that the parametric model can be precomputed in any one of a number of ways.

The atrium shape can be represented as the isosurface of a field function, defined at all points within a bounding domain. Each point is transformed into the internal coordinate systems of the parametric model, by applying a series of coordinate transformations such as those described herein. The contribution of each anatomical part is then computed on the transformed coordinates. A final field function is computed by blending contributions of anatomical parts of the atrium shape.

Coordinate transformations can include, but are not limited to bounding sphere transformation, skewing transformation, spherical projection transformation, and stretching transformation. According to one or more embodiments, an affine transformation can be used. With respect to bounding sphere transformation, a point, given in the patient coordinate system, is transformed to a domain bounded by the unit sphere, by applying transformation $T_{bounds}$ according to Equation 1.

$$x_{skewed} = T_{bounds}(t) \quad \text{Equation 1}$$

The transformation parameters can be chosen as described herein (e.g., such as an initial transformation computation described in block 320 of FIG. 3). For example, a bounded space in patient coordinates systems is transformed to a bounded unit sphere. All transformations can one to one and onto and, therefore, are invertible (e.g., except at poles).

Figure 7:
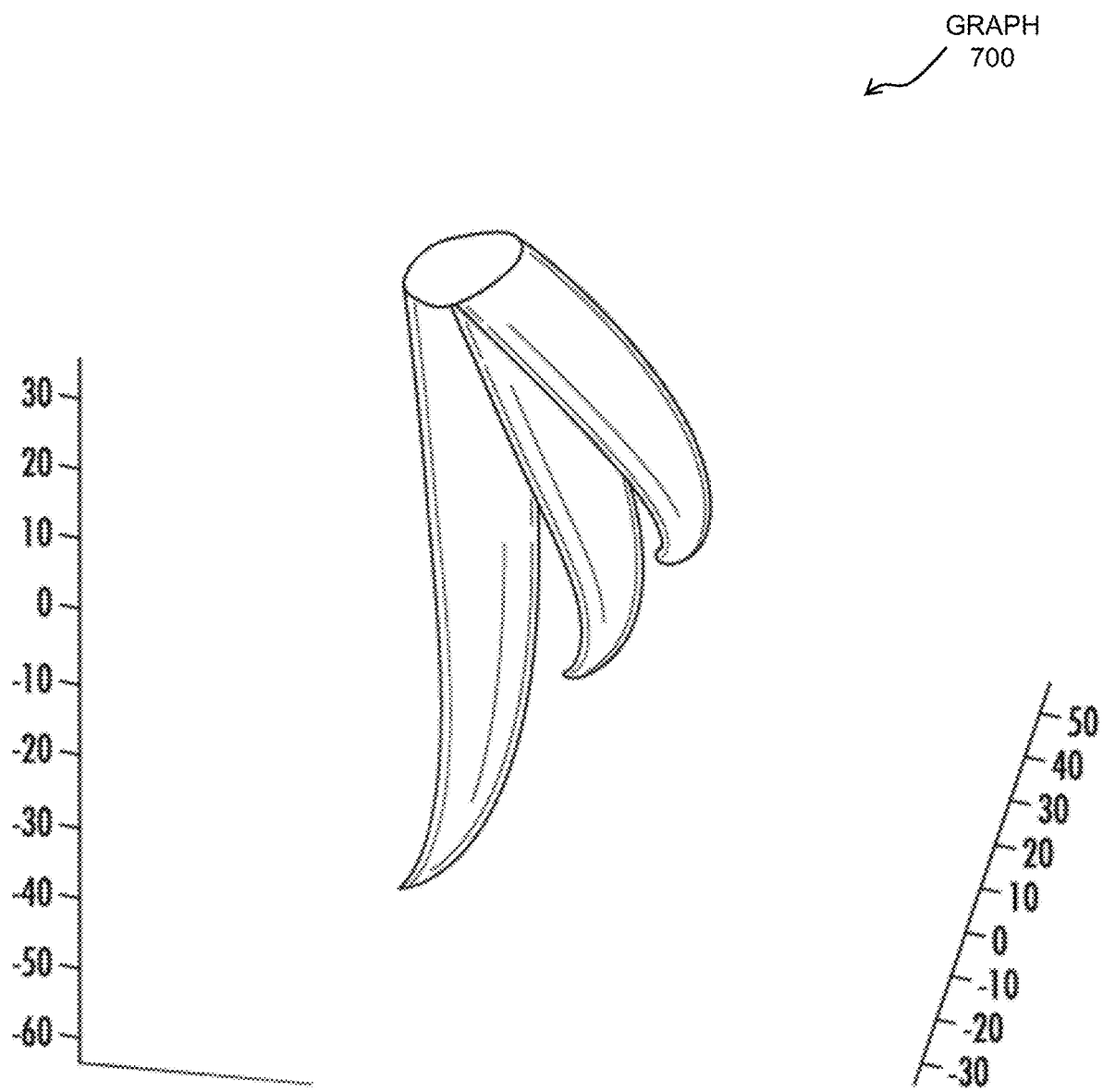
FIG. 7 illustrates a graph according to one or more exemplary embodiments.

With respect to skewing transformation, for each anatomical part j, a skewing center $x_{0,skew}^j$ is defined. A coordinate transformation is then applied, such that the origin is transformed to $x_{0,skew}^j$. In one embodiment, the transformation is defined according to Equation 2:

$$x_{skewed} = x^j + (1-r_j)x_{0,skew}^j \quad \text{Equation 2}$$

where $r_j = \|x^j\|$. This transformation can be inverted to compute coordinate x' given coordinate $x_{skewed}$. The effect of various parameters of the skewing transformation on a tubelike structure is shown in FIG. 7. FIG. 7 illustrates a graph 700 comprising three different values 701, 702, 703 of skew center location on a model tube.

With respect to spherical projection transformation, for some anatomical parts, "un-skewed" coordinates $x^j$ are projected into a flattened coordinate system by applying a spherical projection, such as the stereographic projection according to Equation 3a:

$$x_{projected}^j = r_j T_{proj}\left(\frac{x^j}{r_j}\right) \quad \text{Equation 3a}$$

where $T_{proj}$ is a spherical projection transformation. According to one or more embodiments and as seen in Equations 3b, 3c, and 3d, where the location $\overline{X}$ is composed of a $\hat{\gamma}_1$ component, with a size $r_{parallel}$ (e.g., height of the plane), and a perpendicular component:

$$\overline{\pi} = r_{parallel}\hat{\gamma}_1 + \overline{\pi}_\perp \Rightarrow \overline{\pi}_\perp - r_{parallel}\hat{\gamma}_1 \quad \text{Equation 3b}$$

$$r_{parallel} = \overline{\pi} \cdot \hat{\gamma}_1 \quad \text{Equation 3c}$$

$$\overline{X} = r_{parallel} \left( \frac{\overline{\pi} + \frac{(\overline{\pi}_\perp)^2}{4}\hat{\gamma}_1}{1 + \frac{(\overline{\pi}_\perp)^2}{4}} \right) \quad \text{Equation 3d}$$

Note that $\hat{\gamma}_1$ can be a unit vector pointing towards a center of an anatomical part. The gamma-space to a ball projection preforms an inverse spherical projection for all the planes $p_r(0 \leq r \leq 1)$ in the gamma-space. Each plain with height $r_{parallel}$ is projected to a sphere with radius r, hence the image of the gamma-space to ball projection is a unit sphere centered around the origin. For instance, to calculate the field, the reconstruction engine 101 can take un-skewed cords from ball to gamma space (inverse spherical).

With respect to stretching transformation, for some anatomical parts, the projected coordinates are stretched in the z direction (perpendicular to the projection plane), by applying a stretching transformation. In one embodiment, this transformation is defined by a power transform parametrized by $\alpha_j$, wither respect to Equations 4 and 5:

$$h_j = 1 + (r_j^{\alpha_j} - 1)/\alpha_j \quad \text{Equation 4}$$

$$\xi^j = h_j T_{proj}\left(\frac{x^j}{r_j}\right) \quad \text{Equation 5}$$

Figure 8:
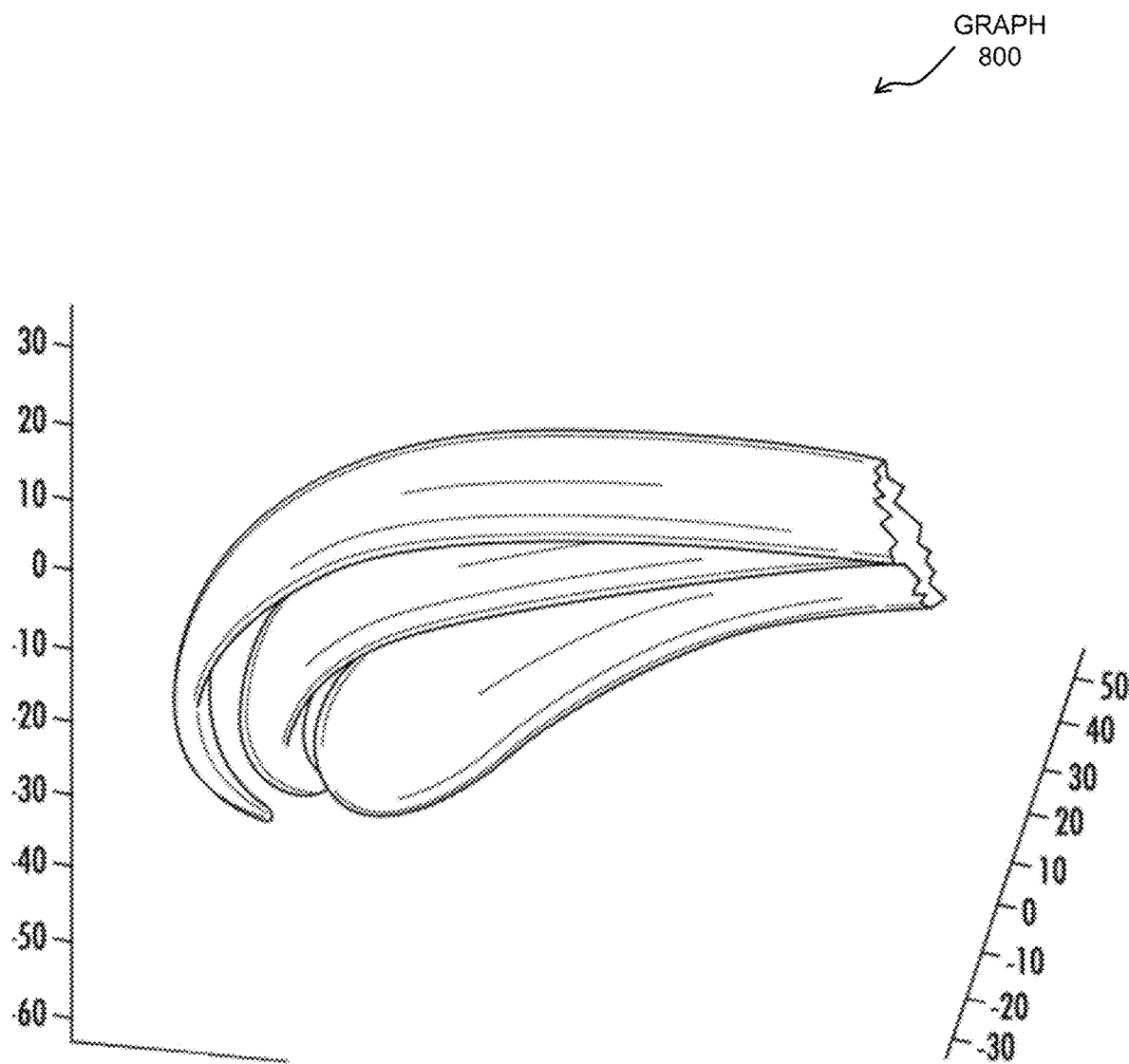
FIG. 8 illustrates a graph according to one or more exemplary embodiments.

The effect of varying the stretching parameter $\alpha_j$ on the tube curving rate is shown in FIG. 8. FIG. 8 illustrates a graph 800 comprising three different effects 801, 802, 803 of stretch parameter on tube curving rate. Note that the location and orientation of the tube at its opening are constant, as well as the tube target location (e.g., skewing center). The power transform can be elaborated to a similar piecewise power transform with continuous value and derivative, with a separate $\alpha_{jk}$ parameter for each tube j and piece k.

As discussed herein with respect to anatomical part fields, the field contribution of each anatomical part at any given point is computed by applying a field formula to the transformed point coordinates. According to one or more embodiments, types of anatomical parts can include tubes and ellipsoids. For a tube field formula, tube j is parametrized by unit vector $\mu^j$ defining the tube center, orthogonal unit vectors $\delta_{2,3}^j$ defining the principle axis directions, scalars $\lambda_{2,3}^j$ defining the axis lengths, inflation function $\eta_j(x)$, and field function $f_{tube}(\bullet)$. The field contribution $f_{tube}^j$ of the tube at a given point is defined according to Equations 6 and 7:

$$f_{tube}^j = f_{tubes}((\xi^j - \mu^j)^T \Sigma_j^{-1}(\xi^j - \mu^j)) \quad \text{Equation 6}$$

where the cross section ellipsoid matrix $\Sigma_j^{-1}$ is given by $$\Sigma_j^{-1} = \left[ \frac{\delta_2^j \delta_2^{jT}}{(\lambda_2^j)^2} + \frac{\delta_3^j \delta_3^{jT}}{(\lambda_3^j)^2} \right] / \eta_j^2(x^j) \quad \text{Equation 7}$$

The inflation function $\eta_j(x)$ may be defined as a flattened power transform parametrized by $\beta_j$, such as according to Equation 8:

$$\eta_j = (r^{\beta_j} - \beta_j r)/(1 - \beta_j) \quad \text{Equation 8}$$

where $r = \|x\|$.

Figure 9:
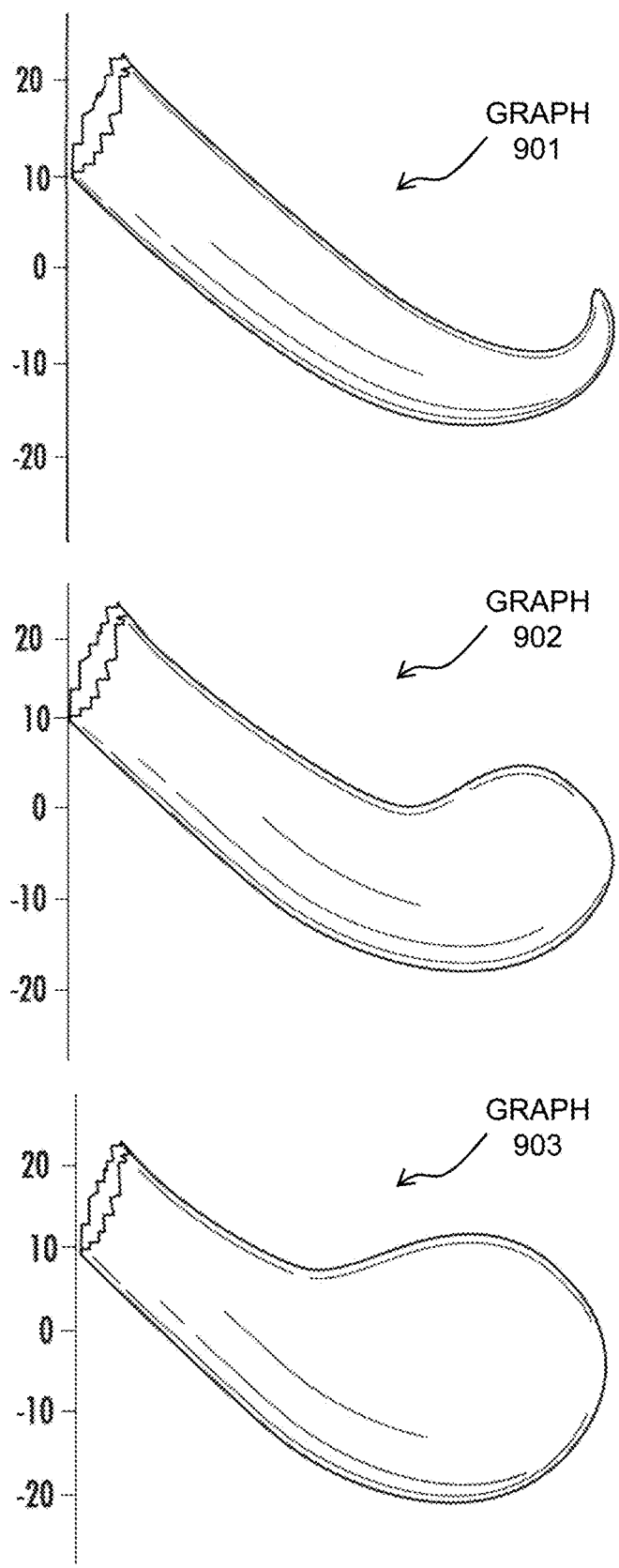
FIG. 9 illustrates a graph according to one or more exemplary embodiments.

FIG. 9 illustrates an effect of inflation parameter $\beta_j$ through graphs 801, 802, 803 according to one or more embodiments. The inflation function can also be elaborated to a continuous smooth piecewise function with a separate $\beta_{jk}$ parameter for each tube j and piece k. The field function $f_{tubes}(\bullet)$ may describe a standard decaying function such as a Gaussian or Lorentzian. An isosurface of $f_{tube}^j$ will describe a tube that intersects the unit sphere at pi with centerline direction $\delta_1^j = \delta_2^j \times \delta_3^j$ and an approximately elliptic cross section. The tube curves towards its endpoint $x_{0,skew}^j$ at a rate determined by $\alpha_1$, gradually inflating or deflating at a rate determined by $\eta_j$. Example tubes are shown in previously referenced figures.

For an ellipsoid field formula, ellipsoid k is parametrized by unit vector $\mu^j$ defining its center, orthogonal unit vectors $\delta_{1,2,3}^j$ defining the principle axis directions, scalars $\sigma_{2,3}^j$ defining the axis lengths, and field function $f_{ellipsoid}(\bullet)$. The field contribution $f_{ellipsoid}^j$ of the ellipsoid at a given point is defined according to Equation 9:

$$\eta_{ellipsoid}^j = f_{ellipsoid}((x^j - \mu^j)^T \Sigma_j^{-1}(x^j - \mu^j)) \quad \text{Equation 9}$$

where matrix $$\Sigma_j^{-1} = \sum_{1,2,3} \frac{\delta_{123}^j \delta_{123}^{jT}}{(\sigma_{123}^j)^2}.$$

Figure 10:
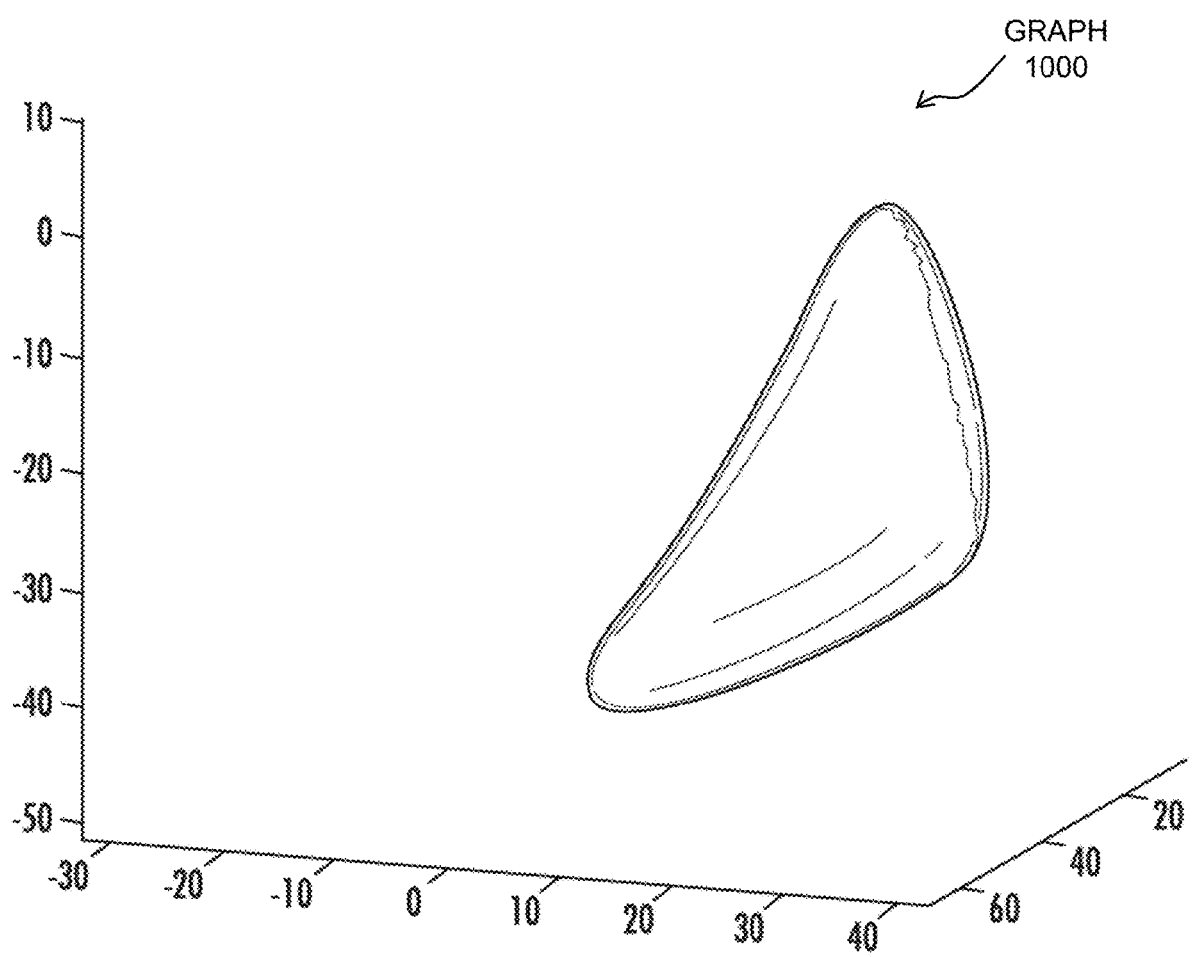
FIG. 10 illustrates a graph according to one or more exemplary embodiments.

An isosurface of $f_{ellipsoid}^j$ describes a skewed ellipsoid centered at $\mu^j$ with skewing given by $x_{0,skew}^j$. An example of a skewed ellipsoid is shown in FIG. 10. FIG. 10 illustrates a graph 1000 of a skewed ellipsoid according to one or more embodiments.

As noted herein, the final field function is computed by blending contributions of anatomical parts of the atrium shape. For instance, with respect to a blending function, contributions of the various anatomical points are combined by applying a blending operator. This can be accomplished by a pointwise linear combination of the contributions according to Equation 10:

$$f = \Sigma_j w_j f^j \quad \text{Equation 10}$$

where $w_j$ can be weight parameters.

Figure 11:
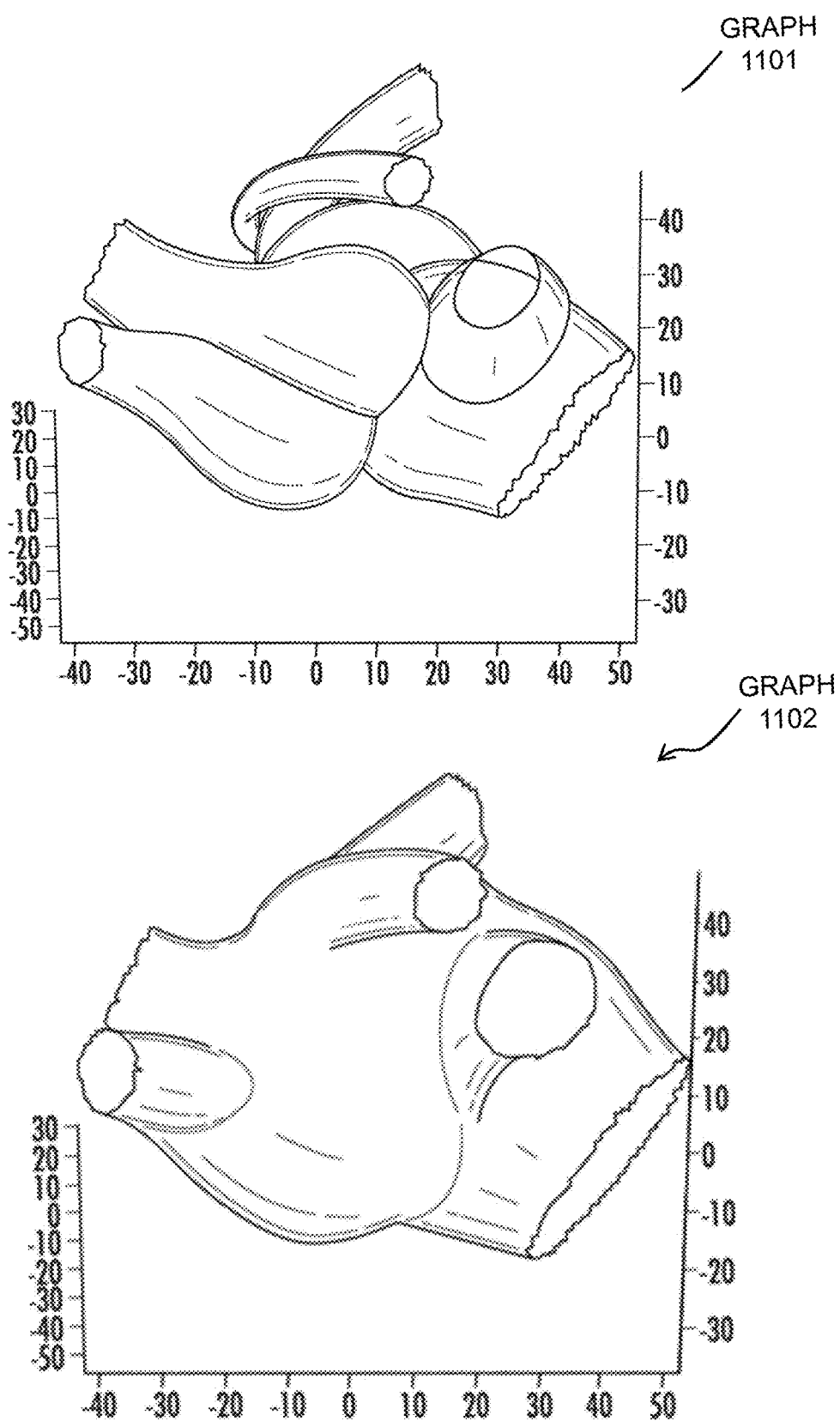
FIG. 11 illustrates a graph according to one or more exemplary embodiments.

Further, a blending (e.g., a part fields blending) is shown in FIG. 11. FIG. 11 illustrates graphs 1101 and 1102, where individual isosurface parts are shown graph 1101, with a blended atrium model isosurface being shown graph 1102. Note that a surface definition, such as a left atrial surface, can be defined as points in which the field function equals a threshold parameter, $f = f_{thresh}$. For instance, points where $f > f_{thresh}$ are considered within the atrium model, and points where $f < f_{thresh}$ are considered outside the atrium model.

Determining one or more features of the parametric model are now discussed with respect to anatomical features formulae. Beginning with tube centerlines, in the $\xi^j$ coordinate system, the tube centerlines can be straight lines. For desired height h, the tube centerline point $\xi_{ctr}^j(h)$ may therefore be computed according to Equation 11:

$$\xi_{ctr}^j(h) = \mu^j + (h - \mu^j \cdot \gamma_1^j)\frac{\delta_1^j}{\delta_1^j \cdot \gamma_1^j} \quad \text{Equation 11}$$

where $\gamma_1^j$ is a unit vector defining the pole of the spherical projection $T_{proj}$ for tube j. The centerline coordinates may then be transformed to any desired coordinate system, using the coordinate transformations defined herein. A tube center feature may be defined by choosing height h corresponding to the tube cut locations used for the sample.

Regarding tube orientations, the tube orientations can be given in the $\xi^j$ coordinate system by the unit vectors $\delta_1^j$. These vectors can be transformed by multiplying them by the Jacobian matrix of the desired coordinate transformation. Orientations may be represented by orthographic projection of said unit vectors about their mean direction, yielding a 2-parameter representation of the tube direction.

Regarding tube areas, tube cross section ellipse areas $A^j$ are given in any coordinate system by $A^j = \pi l_2 l_3$, where $l_2, l_3$ are given by the inverse of the eigenvalues of matrix $\#J^{-1}\Sigma_j^{-1}J^{-1}$, where J is the Jacobian of the transformation, and # is a normalization factor computed from the tube weight and field threshold.

Regarding tube ellipse extents, tube cross section ellipses can be alternatively described by computing the projections $\hat{v}_{jk}^T \Sigma_j^{-1} \hat{v}_{jk}$, where $\hat{v}_{jk}$ denote a predefined set of unit vectors residing in the plane of the ellipse. For example, for tube j, a vector pointing towards a designated neighboring tube j' may be defined according to Equation 12:

$$v_{j,neigh} = (I - \delta_1 \delta_1^{jT})(\xi_{ctr}^{j'} - \xi_{ctr}^j) \quad \text{Equation 12}$$

A set of three (3) unit vectors describing the ellipse's remaining degrees of freedom may then be defined as:

$$\hat{v}_{j1} = \frac{v_{j,neigh}}{\|v_{j,neigh}\|}, \hat{v}_{j2} = R(\delta_1^j, +120°)\hat{v}_{j1}, \hat{v}_{j3} = R(\delta_1^j, -120°)\hat{v}_{j1},$$

where R(axis, angle) denotes rotation matrix around the axis at the given angle.

Regarding ridge points, for two neighboring tubes j and j', an approximate midpoint line $x_{midpoint}(h)$ can be defined, by projecting the vector connecting the tubes' centerlines on to the tubes' ellipse matrices, according to Equations 13, 14, and 15:

$$\Delta x_{ctr} \equiv x_{ctr}^j(h) - x_{ctr}^{j'}(h) \quad \text{Equation 13}$$

$$d['] = \sqrt{\Delta x_{ctr}^T \sum\nolimits_{j[']}^{-1} \Delta x_{ctr}} \quad \text{Equation 14}$$

$$x_{midpoint}(h) = x_{ctr}^j + \frac{d'}{d+d'} \Delta x_{ctr} \quad \text{Equation 15}$$

where centerline points $x_{ctr}^{j[']}$ and ellipse matrices $\Sigma_{j[']}^{-1}$ are transformed into the $x_{skewed}$ common coordinate system using standard point and bilinear operator transformation methods.

Figure 12:
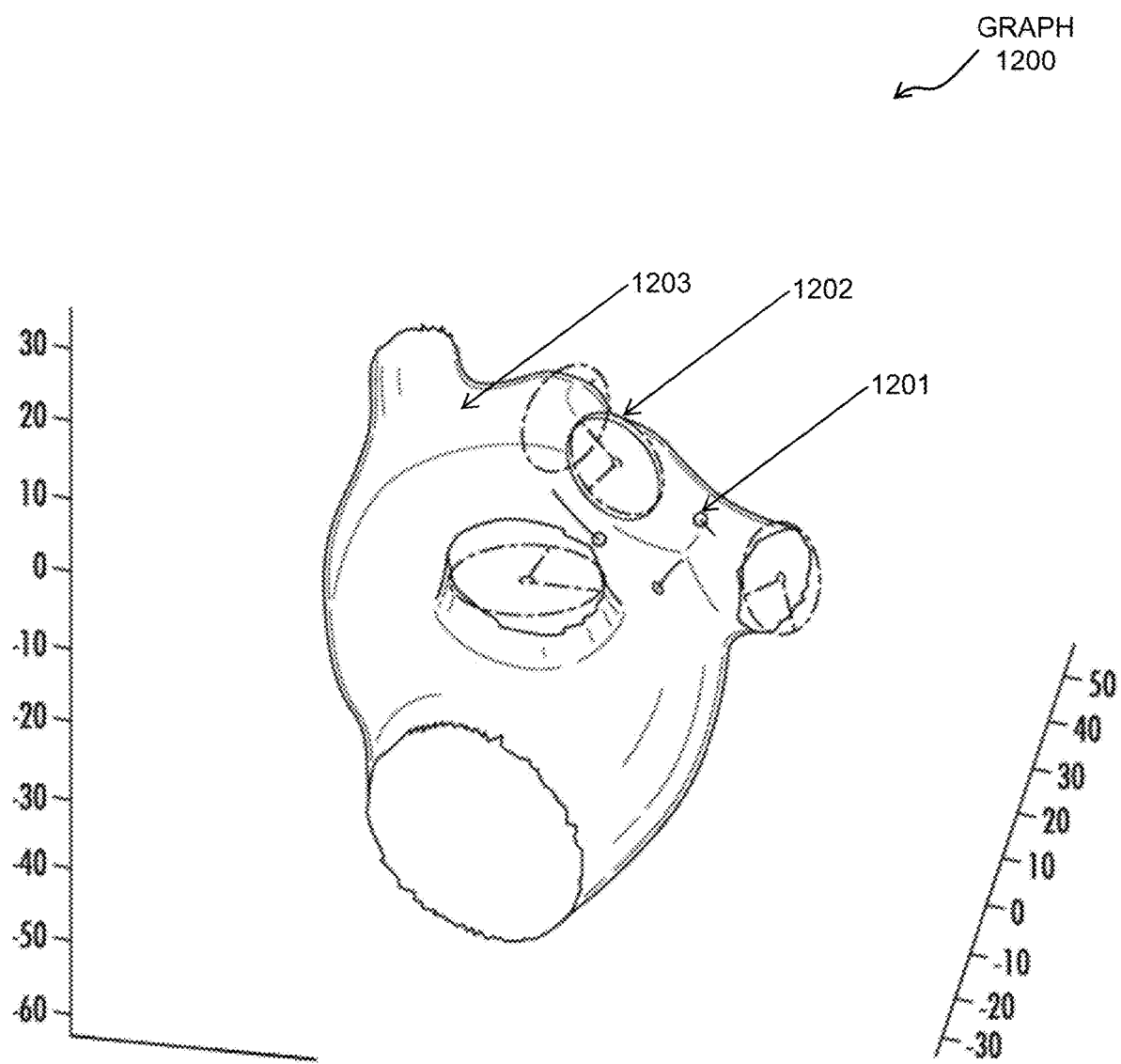
FIG. 12 illustrates a graph according to one or more exemplary embodiments.

The approximate midpoint line can then be intersected with the atrium surface, by sampling some height values and detecting the point where field function reaches threshold $f = f_{thresh}$. This intersection point $x_{ridge}^{jj'}$ will occur at the ridge location, as shown in FIG. 12. FIG. 12 illustrates a graph 1200 showing approximate midpoint lines 1201 and ridge points 1202 on model atrium surface 1203.

Regarding atrium volume, the atrium volume can be computed by sampling the domain and summing the areas associated with all points for which $f > f_{thresh}$.

Regarding secondary features, anatomical measurements described herein can be used to compute secondary features, such as chord length between tube centers, e.g. left chord between left inferior PV and left superior PV; twist angle between the left and right chords; tube location vector, connecting the atrium center to the tube centers, normalized to unit length, represented by orthographic projection about mean vector direction; angle between tube location vector and tube orientation vector; and sums of tube cross section areas.

Returning to FIG. 6, at block 610, the reconstruction engine 101, then, executes a model fitting procedure that optimizes shape fit to the data and the statistical prior, subject to constraints, with respect to the model parameters. Operations, as discussed herein, include computing cost and constraint functions 615, computing cost and constraint derivatives 620, updating model parameters (e.g., sequential quadratic programming updates) 630, updating input data 640, updating optimization hyperparameters 650, and updating tube cuts (e.g., every n iterations) 660. The model is fit by minimizing a highly nonlinear cost function, subject to multiple nonlinear constraints, with respect to model parameters.

Regarding statistical prior construction, the reconstruction engine 101 can implement a dataset construction and a statistical modeling. For the dataset construction, left atria meshes are constructed from CT scans. The atria are separated from the pulmonary veins trees, mitral valve, and appendage by manually cutting them such that short stumps remain connected. The resulting holes are easily identified with their anatomical parts based on their location in the CT coordinates. The resulting meshes are then smoothed, decimated, and corrected for topology. The shape model is fitted to each atrium mesh, using a similar procedure to the one described below (with data term only), with dense points data taken from the mesh surface. The anatomical features are then computed from the resulting models. According to one or more embodiments, the CT scans that were used to develop the mFAM model represents anatomies described in FIG. 13. FIG. 13 illustrates a table 1300 that shows similarities to normal anatomical variabilities of the patient population.

For statistical modeling, to compare the features across the dataset, the shapes are registered to a common coordinate system based on anatomical landmarks. The joint distribution of the normalized features (and selected model parameters) across the dataset was modeled by analyzing the resulting correlations in the dataset. The reconstruction engine 101 can receive a manual selection of a subset the features and correlations and constructed a multivariate normal distribution, defining a prior on the anatomical features of the left atria.

According to one or more embodiments, the reconstruction engine 101 can implement one or more adaptive sampling schemes and mesh computations. For example, regarding a pyramid data sampling, catheter points, along with their anatomical tags and force values, are sampled in a 6-level pyramid, generated by splitting the domain recursively into octants.

In an example pyramid, each parent voxel is assigned eight (8) child voxels at the next (lower) pyramid level. For each voxel, the reconstruction engine 101 computes a number of catheter entry events. In an example, a finest resolution of 1 is recorded if there was any recorded catheter point in the voxel, 0 if not. For parent voxels, sum of child voxel values can be recorded. Further, for a number of contacts, a finest resolution can be 1 if there were any catheter points within force gate in the voxel, and 0 if not. Again, for parent voxels, sum of child voxel values can be recorded. Furthermore, for a number of external, a finest resolution of 1 is recorded if there were any catheter points with force value above the maximum force gate in the voxel, and 0 if not. For parent voxels, sum of child voxel values can be recorded.

Furthermore, for a number of internal, a finest resolution of 1 is recorded if there was any recorded catheter point in the voxel, and all were below force gate or without force information. For parent voxels, sum of child voxel values can be recorded. Furthermore, anatomical tags can be defined as 1 for all anatomical parts that were tagged on any points within the voxel. A center of mass can be a center of voxel at the lowest pyramid level (approximately 2 mm voxel size). A center of mass, at higher levels, can use center of all "full" voxels contained within this voxel. Other values include a force magnitude, which is an average force magnitude of all catheter points within force gate in the voxel; a force direction, which is a unit vector, normalized average of all force direction vectors of all points within force gate that were in the voxel; a high force magnitude, which is an average force magnitude of all catheter points above force gate in the voxel; and a high force direction, which is a unit vector, normalized average of all force direction vectors of all points above force gate that were in the voxel. Any value can be computed separately for all catheter entries, contacts, external, and internal event types. It should be understood that the examples provided above are not limiting and that other data points may also be used.

These quantities are updated using running averages whenever new points arrive. At each iteration, (e.g., after "update input data" at block 380 of FIG. 3), the pyramid is updated with new catheter points.

For example, regarding multiresolution atrium surface computations, the reconstruction engine 101 computes a "surface mask" and "field value array" for each pyramid level, denoting voxels that contain portions of the left atrial surface. In this regard, the reconstruction engine 101 computes landmark points (tube centerlines and ridge search lines as described herein); initializes "input voxels" to all voxels belonging to the highest (=least subdivided) pyramid level (=8 voxels covering entire bounding domain); and computes model field function at center of each "input voxel". The reconstruction engine 101 also updates current pyramid level's "field value array" at all "input voxel" locations with these computed model field function values; computes "atrium mask value" at each voxel center, by comparing "field value array" to threshold parameter fthresh; and computes "edge voxels", defined as voxels whose "atrium mask value" is different from that of any of their neighboring voxels. The reconstruction engine 101 computes "conflicted voxels", defined as any voxels whose atrium mask value is different from that of any landmark points located in the voxel. The reconstruction engine 101 saves union of "edge voxels" and "conflicted voxels". This is called the "surface mask" of current pyramid level. The reconstruction engine 101 initializes next pyramid level's "field value array" to upsampled version of current level's "field value array"; again computes model field function using next pyramid level, using only the child voxels of current "surface voxels" as input; and stops when lowest pyramid level is reached. The outputs include a "surface mask" for each pyramid level, denoting atrium surface at multiple resolutions and a "field value array" for each pyramid level, containing estimated field values at all locations and all resolutions.

For example, regarding octree-like voxels subsampling, the reconstruction engine 101 uses the surface masks described herein, to select a subset of the pyramid voxels, such that areas near the model surface are sampled at high resolution, while areas farther from the model surface are sampled at reduced resolution. For instance, the reconstruction engine 101 starts from lowest (=most subdivided) pyramid level; selects "surface mask" of current level; adds sibling voxels of the surface mask at current level; starts from second iteration (Remove parent voxels of octree mask computed at previously visited level); and returns to select the "surface mask". The result can include an "octree mask" for each pyramid level. The union of all the "octree masks" provides a multiresolution coverage of the entire domain, sampled at high resolution near the model atrium surface and progressively lower resolutions at areas farther from the surface. The octree masks can be used by the reconstruction engine 101 to compute the data term in the cost function in an efficient manner.

The reconstruction engine 101 can also provide mesh computations. For instance, to generate a left atrium mesh, the reconstruction engine 101 applies a standard isosurface algorithm (e.g., Marching Cubes) to the "field value array" of highest pyramid level. This mesh is readily available at each iteration of the algorithm for the current set of model parameters.

The reconstruction engine 101 can also provide model fitting. In this regard, a goal of the reconstruction engine 101 is to estimate the model parameters that provide the best possible fit to all current data, while preserving an anatomically plausible atrium shape, as defined by the statistical prior. After model initialization, this is achieved by minimizing an appropriate cost function under a set of constraints, as described herein in detail.

Regarding initial transformation computation of the reconstruction engine 101, to initialize a model fitting process, anatomically tagged points from both left (LIPV, LSPV) and right (RSPV, RIPV, or septum) sides of the atrium are required. An initial template model is then transformed such that its corresponding anatomical features (PV centers and/or septum) are optimally matched to the known tagged locations. The location of the tags of tagged PV pairs from the same side (RI and RS, or LI and LS), are shifted towards one another. The reconstruction engine 101 can also compute an optimal similarity transformation using the pairs of known points (model features and centers of tagged points). The transformation is then applied by modifying the bounding sphere model parameters.

Regarding an iterative optimization algorithm, the reconstruction engine 101 estimates the model parameters by minimizing a cost function (2.9.3), subject to nonlinear constraints (2.9.4), using the Sequential Quadratic Programming (SQP) algorithm. New data points and user inputs (tags, magnets, etc.) are updated after each iteration. To control the convergence, the reconstruction engine 101 applies a coarse-to-fine model fitting schedule. The relative contributions of various cost function terms (detailed below) are controlled by a number of hyperparameters, which are modified after a fixed number of iterations as per the schedule.

Regarding a cost function, the reconstruction engine 101 formalizes a cost function as the additive inverse of a sum of log likelihood terms $Q_{[\ ]}$, attributed to various events given in the currently known data. The relative weights of the various terms are determined by the number of independent events associated with each term, some of which are controlled by the model fitting schedule. Terms are centered such that their contribution is 0 at the mode of their associated probability distribution. The statistical model is used to add a prior term to the cost function.

Regarding a data term (e.g., coarse fit to tagged points), the reconstruction engine 101 computes, for each available anatomical tag, the center of all tagged voxels. The reconstruction engine 101 computes the distance of these "tag centers" to the closest point on their corresponding tube centerlines. This distance is assigned a Gaussian distribution (with std of 2 mm). Each tag center is assigned one independent statistical event. The contribution $Q_{tagCenters}$ of this term is given by the log probability by this distribution (centered to 0). This data term serves to bring the tagged PV's to the correct general locations at early stages of the optimization. For tagged pairs of PVs that tend to have common ostia, i.e. left superior with left inferior or right superior with right inferior, the tag centers of both PVs are shifted towards one another in the early stages of the optimization to prevent their separation by magnets at later stages.

Regarding a data term (e.g., volume samples), the reconstruction engine 101 computes an approximate distance function. The signed distance D of a data point x from the model atrium surface may be approximated according to Equation 16:

$$D(x) = (f(x) - f_{thresh}) \left[ \frac{1}{\|\nabla f(x)\| + \varepsilon} + \frac{d_{internal}}{(w_j)} \right] \quad \text{Equation 16}$$

where $\varepsilon$ is a small baseline value that ensures numerical stability in areas where the field function is nearly flat, and $d_{internal}$ defines typical distance value returned for points deep inside the current reconstruction.

Regarding generative model of catheter points sampling probability, the lowest (=finest) level of pyramid defines the basic spatial resolution of the model. All locations within a given voxel at this resolution are considered identical. The reconstruction engine 101 associate one independent statistical event for every "volume_samples_per_event" voxels. The hyperparameter "volume_samples_per_event" is gradually reduced as per the model fitting schedule, effectively increasing the contribution of this data term as convergence progresses.

The reconstruction engine 101 defines a "mixture model", whose components are different anatomical parts described by our atria shape model. Each point is sampled from an anatomical part j. The anatomical part may or may not be known, depending if the user provided an anatomical tag for the point.

The reconstruction engine 101 model the conditional probability of the catheter visiting voxel at location x, given that the catheter is currently sampling from anatomical part j, according to Equation 17:

$$P(x|j) \propto w_j(x)m(x) \quad \text{Equation 17}$$

where $w_j$ (defined below in 2.9.3.2.4) measures membership of location x to the anatomical part, and m(x) measures amount of atrium mass in the voxel. We model m(x) as a sigmoidal function of the approximate signed distance D(x) of the voxel's center of mass. The width of the sigmoid is proportional to the cubed root of voxel volume, and is adjusted to account for the location of the center of mass within the voxel. Note that the heavy-tailed form of the model field function induces a heavy-tailed form on D and on m, leading to robustness to outlier points such as those caused by tenting artifacts. Note, for example, that tenting artifacts can be artifacts caused by the catheter 110 pushing the left atrial tissue.

If the reconstruction engine 101 knows that component j has been well-sampled by the catheter, the reconstruction engine 101 can normalize the probability by total mass of the component, by summing over all voxels x' in the domain according to Equation 18:

$$P(x|j) = \frac{w_j(x)m(x)}{\sum_{x'} w_j(x')m(x')} \quad \text{Equation 18}$$

This will introduce a "shrinking" term into the cost function, and cause the model to fit tightly to the points in the corresponding areas.

If the component is not known to be uniformly sampled, the reconstruction engine 101 can still assume the numerator, and use some constant (initial mass) as a placeholder for the unknown denominator. This will still cause the model to be attracted to the samples, without necessary shrinking to a tight fit.

Two methods are available for determining whether to consider a component well-sampled: "all true", where all components are always considered well-sampled; and "tag based" where all components tagged by the user are considered well-sampled.

Regarding a cost function contribution, as common in expectation maximization (EM) or mixture model frameworks, the reconstruction engine 101 can average the log likelihood over initial membership probabilities for each of the components according to Equation 19:

$$Q_{volumeSamples} = \sum_{i,j} -\log(P(x_i|j))P_o(j|x_i) + const \quad \text{Equation 19}$$

In practice, this cost function contribution is calculated for all voxels i in the octree masks. The constant term is chosen such that $Q_{volumeSamples}=0$ if all samples are completely inside of the atrium and their anatomical tags perfectly match their current $w_j(x)$. Larger voxels are assigned weights proportional to their volumes. Voxels are also weighted by the total number of internal and contact events in the voxel (ignoring external high-force events).

For voxels with associated user tags, $P_0$ is given by assigning a probability to all tags given for the voxel, proportional to the number of tagged sub-samples, and zero probability for all other j.

For voxels that were not tagged by the user, we estimate $P_0$ based on a previous model state, according to Equation 20:

$$P_0(j|x) = \frac{w_j(x)}{\sum_{j'} w_{j'}(x)} \quad \text{Equation 20}$$

The $P_0$ values are held fixed for a predefined number of iterations, and are periodically re-estimated based on the updated atrium model.

Regarding a membership weights definition, the reconstruction engine 101 can define a tube membership formula according to Equation 21:

$$w_j^{tube} = 1 - threshLin\left[1 - \frac{f_j(x)}{f_{thresh}}\right] \quad \text{Equation 21}$$

where threshLin is a smoothed threshold linear function. This membership function behaves like the individual tube field function for small values, and saturates to 1 when its value reaches the threshold. It is independent of contributions of the other tubes.

To differentiate left atrium body for tube ostia, the reconstruction engine 101 can add a radial dependency according to Equations 22 and 23:

$$R_j(r) = \text{Sigmoid}(r - r_{0j}) \quad \text{Equation 22}$$

$$w_j^{ostium}(x) = w_i^{tube}(x) R_j(r(x)) \quad \text{Equation 23}$$

From here follows definition for atrium body according to Equations 24 and 25:

$$w_{whole\_atrium}(x) = 1 - \text{threshLin}\left[1 - \frac{f_{whole\_atrium}(x)}{f_{thresh}}\right] \quad \text{Equation 24}$$

$$w_{atrium\_body}(x) = \text{threshLin}\left[w_{whole\_atrium} - \sum_j w_j^{ostium}(x)\right] \quad \text{Equation 25}$$

The reconstruction engine 101 can use the tubes ostia and the atrium body as the anatomical parts j in the generative model.

Regarding a data term (e.g., surface and external points), the reconstruction engine 101 can compute an input definition and assumptions. For instance, with respect to the input definition, known surface and external points are collected from the following sources, such as centers of mass of all octree voxels containing a contact (force-gate) event, user defined "magnet" points, ablation points, and acquired points from other systems.

For instance, with respect to the assumptions, surface and external points term express the following: surface points' force direction vectors have a high probability of matching the surface normal; surface points (within force gate) have a high probability of being close to the atrium surface; external points (above force gate) have low probability of being inside the atrium, and uniform probability of being anywhere outside the atrium; points with user-provided anatomical tags have a high probability of being within areas belonging to corresponding anatomical parts of the atrium model; and the shape of the probability distributions, implemented by their degrees-of-freedom (DOF) parameters, is chosen depending on the source of the surface points. For user-defined magnets, as well as ablation and acquired points, we use DOF=∞ (Gaussian-like distributions). This expresses the high confidence in these points, and creates a strong (spring-like) attractive force when magnets are far from the model surface. For other contact samples in the octree, we use DOF=1 (Cauchy type distributions), generating heavy-tailed behavior with a higher tolerance for outliers.

Regarding an orientation term (e.g., surface and external points), the reconstruction engine 101 can compute a probability distribution. The probability distribution of the measured force direction unit vectors $f$ is centered around the normalized model field gradient g at the point location, with angular tolerance $\psi =$ $$45° = \frac{45\pi}{180}.$$

For magnets (DOF=∞), a von Mises-Fisher distribution is used according to Equation 26:

$$Q_{orientation} = \frac{f \cdot g - 1}{\psi^2} \quad \text{Equation 26}$$

For other contact samples (DOF=1), a spherical Cauchy distribution is used according to Equation 27:

$$Q_{orientation} = 2\log(1+(1-\psi)^2 - 2(1-\psi)f \cdot g) + 2\log(1+(1-\psi)^2 - 2(1-\psi)) \quad \text{Equation 27}$$

The constant terms in the costs are chosen such that the cost evaluates to 0 when the orientation vectors are in perfect agreement. Orientation term is applied only to surface points (within force gate).

Regarding a distance term, the distribution of approximated signed distance (2.9.3.2.1) is modeled as a Student-t distribution. For user-defined magnets, as well as ablation and acquired points, we use DOF=∞. This expresses the high confidence in these points, and creates a strong (spring-like) attractive force when magnets are far from the model surface. For tagged magnets, the attractive force is towards the surface of the associated anatomical part. For other contact samples in the octree, we use DOF=1 (Cauchy distribution), generating heavy-tailed behavior with a higher tolerance for outliers. To avoid "sticking" to magnets with non-matching orientations, the scaling parameter $\sigma_{dist}$ of the distributions is defined in an orientation-dependent manner according to Equation 28:

$$\sigma_{distance} = \exp(-Q_{orientation}) \quad \text{Equation 28}$$

This parameter is updated at the start of every optimization epoch (currently set to 10 iterations). The log probability of the chosen distribution, centered to yield 0 when distance is 0, is used to compute this contribution $Q_{distance}$ to the overall cost function. For external points, the distance term is also set to 0 for all negative (outside the atrium model) signed distance values.

Regarding a membership term, the reconstruction engine 101 can, for each surface point xi, compute a membership term based on the current atrium model according to Equation 29:

$$P(j \mid x_i) = \frac{w_j(x_i)}{\sum_{j'} w_{j'}(x_i)} \quad \text{Equation 29}$$

The reconstruction engine 101 can then compute an EM-style cost according to Equation 30:

$$Q_{membership} = \sum_{i,j} -\log(P(x_i \mid j)) P_o(j \mid x_i) = \quad \text{Equation 30}$$

$$\sum_{i,j} -\log(P(j \mid x_i)) P_o(j \mid x_i) - \log(P(x_i)) + const$$

Regarding a full surface points data term contribution, the full contribution of the known surface points is given by Equation 31:

$$Q_{surfacePoints} = Q_{orientation} + Q_{distance} + Q_{membership} \quad \text{Equation 31}$$

For user-defined magnet points, the reconstruction engine 101 can assign by default 1 independent statistical event. The user is able to "weight" each magnet via the mFAM GUI, effectively increasing their contribution if desired. The reconstruction engine 101 can further apply a schedule via hyperparameter "magnets_per_event", to gradually increase the contribution of magnets as the optimization progresses. For general contact samples in the octree, the reconstruction engine 101 can associate one independent statistical event for every "contact_samples_per_event" voxels. The hyperparameter "contact_samples_per_event" is gradually reduced as per the model fitting schedule, effectively increasing the contribution of this data term as convergence progresses.

Regarding a data term (e.g., user-defined centerline and ridge points), to further aid the reconstruction, the mFAM GUI allows the user to define known spatial points constraining specific tube centerlines and/or ridge points. Distances of user-defined centerline points from their closest point on the corresponding tube centerline are modeled as Gaussian distributions with tolerance of 2 mm. Distances of user-defined ridge points are similarly assigned a Gaussian distribution from their corresponding ridge points. Note that log probability, centered at 0, is used as the cost function contributions $Q_{centerlinePoints}$, $Q_{ridgePoints}$. Each user-defined point is assigned one independent statistical event.

Regarding an ellipsoid field ratio term, the ratio between the ellipsoid (ball) field and the final field function is computed in several key locations on the surface of the reconstruction. The ratio is compared to a statistical value. The contribution to this "constraint", $Q_{ballFieldRatio}$ is a sigmoidal function of the difference between the computed and the statistical ratios. This cost term prevents the tubular anatomical parts from wrapping around the ellipsoid, as it compels the field to consists less of the tubes fields and more of the ellipsoid field, in locations where the tubes tend to wrap around it.

Regarding a statistical prior term, the contribution $Q_{prior}$ of the statistical model is defined as log probability of the statistical distribution of current model features, centered by a constant term such that its maximal value is 0. Each feature contributes one independent event to the full cost function.

Regarding a signal cost function formula, the full cost function E is given by summing all terms contributions, and normalizing by total independent events (degrees of freedom) DOF_TOTAL associated with all terms (See Equation 32).

$$E = \frac{Q_{tagCenters} + Q_{volumeSamples} + Q_{surfacePoints} + Q_{centerlinePoints} + Q_{ridgePoints} + Q_{prior} + Q_{ballFieldRatio}}{DOF\_TOTAL} \quad \text{Equation 32}$$

Constraints of the reconstruction engine 101 can be implemented as a penalty score added to cost function. The penalty score is computed according to Equation 33:

$$\text{score} = a + b \cdot \exp(c \cdot \text{SoftMax}(\text{constraints})) \quad \text{Equation 33}$$

where a, b, and c are chosen such that, approximately score $(0) \approx 0$, score $(-1) \approx 0$, and score $(0.1) \approx 1000$. The score value is capped at $10^8$, and from there on continues in a linear fashion with slope 1. With respect to linear and bounds constraints, a number of option are employed by the reconstruction engine 101. For instance, the reconstruction engine 101 can implement minimal tube weights. That is, to prevent tubes from shrinking too much, all tube weights can be constrained to be above a field threshold, such as according to Equation 34:

$$w_j > f_{thresh} \quad \text{Equation 34}$$

Another option includes aspect ratio constraints. Tube and central ellipsoid aspect ratios are constrained, by applying linear constraints to pairs of parameters within sets $\lambda_{2,3}{}^j$ and $\sigma_{1,2,3}{}^j$, respectively. In addition, the aspect ratio of the valve radii, $\lambda_{2,3}{}^{valve}$ is constrained to be close to 1, within a small margin. This ensures that the valve's cross-section is more symmetrically round, and not elliptic.

Another option includes nonlinear constraints. Nonlinear constraints are defined by specifying a function whose value is kept negative by the SQP optimizer.

Another option includes model parameters domain constraints. The central ellipsoid center, central ellipsoid skewing center, and tube skewing centers are constrained to be inside of a sphere of radius 0.99, by defining a nonlinear constraint function on the square norm of the parameter vectors $x_{0,skew}{}^j$ and $\mu^j$.

Another option includes cohesiveness constraints. All tube skewing centers $x_{0,skew}{}^j$, as well as the point on each tube centerline at r=0.11, are constrained to lie inside of the central ellipsoid, by constraining their central ellipsoid field values to be above $f_{thresh}$.

Another option includes ridge point existence constraints. To ensure the ridge points are not engulfed by the atrium model, all computed ridge points are constrained to lie on the model atrium surface by computing for each ridge point the constraint functions according to Equation 35:

$$C_{ridgePoint} = D^2(x_{ridge}) - tol \quad \text{Equation 35}$$

This function remains negative as long as D is close to 0.

Figure 14:
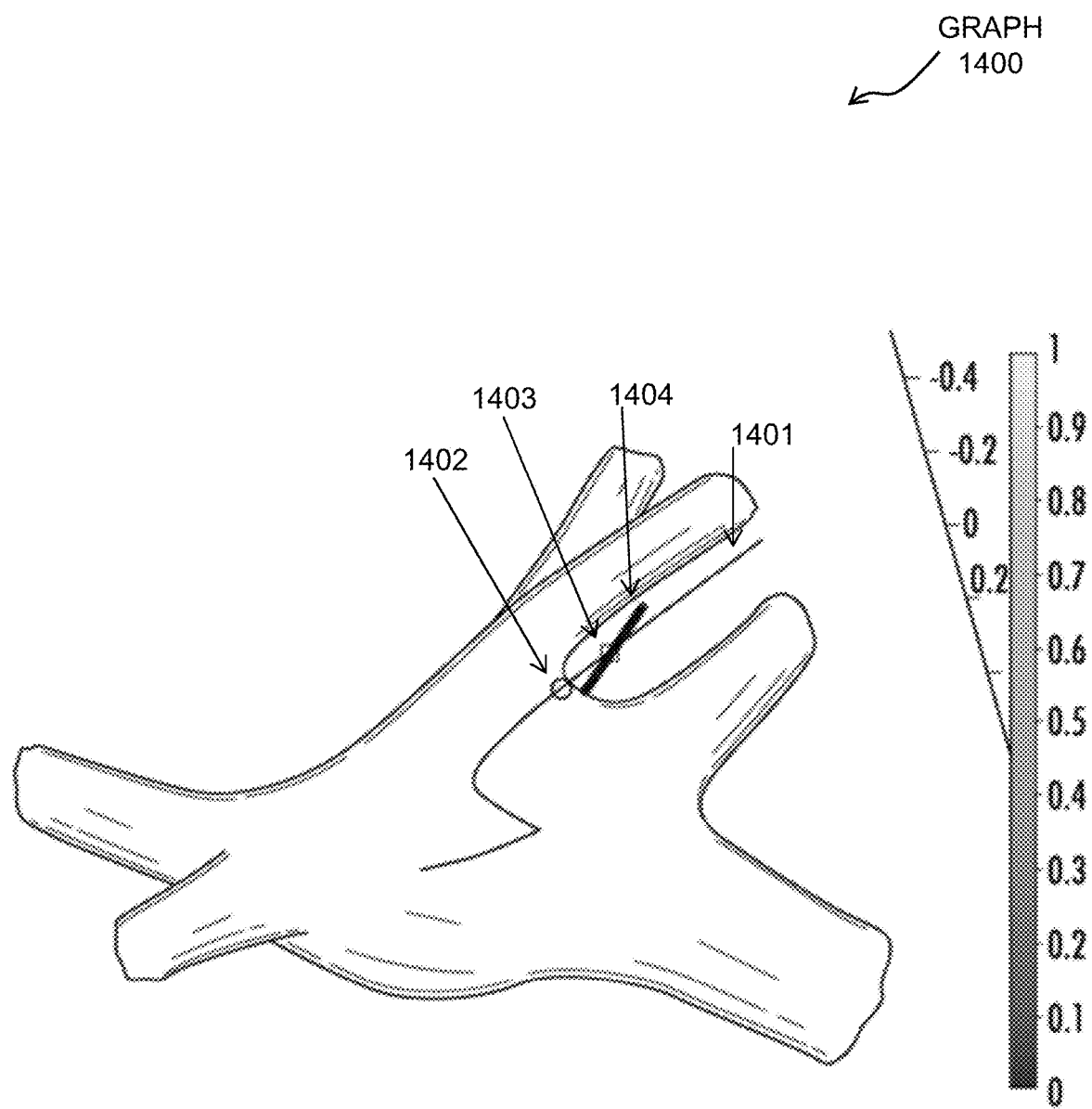
FIG. 14 illustrates a graph according to one or more exemplary embodiments.

Another option includes appendage ridge barrier line constraints. To ensure existence of the appendage ridge, the reconstruction engine 101 can define a barrier line as follows: Barrier line origin point: From the LSPV-appendage ridge point (2.6.5), go 10 mm outwards in the direction of the LSPV tangent vector; Barrier line direction vector: Define a unit vector connecting the LSPV and LIPV centers; Sampling points: Uniformly sample 50 sampling points $x_{barrier}{}^i$ along the barrier line, between its two intersections with the bounding sphere; Distance measurement: Compute approximate distance function $D(x_{barrier}{}^i)$ (2.9.3.2.1) at all sampling points; Weights: Compute sum of LSPV and appendage tube membership weights (2.9.3.2.4) at all sampling points, $w_{barrier}{}^i = w_{tube}{}^{PVS}(x_{barrier}{}^i) + w_{tube}{}^{appendage}(x_{barrier}{}^i)$. Therefore we will ignore points along the barrier line that belong to other anatomical areas such as LIPV; and Compute barrier line constraint function as a weighted soft-max of $D(x_{barrier}{}^i)$ with weights $w_{barrier}{}^i$. Turning to FIG. 14, a graph 1400 shows a barrier line computation including appendage-LSPV ridge line 1401 and ridge point 1402, Barrier line origin point 1403, and sampling points 1404 coded by weights.

Figure 15:
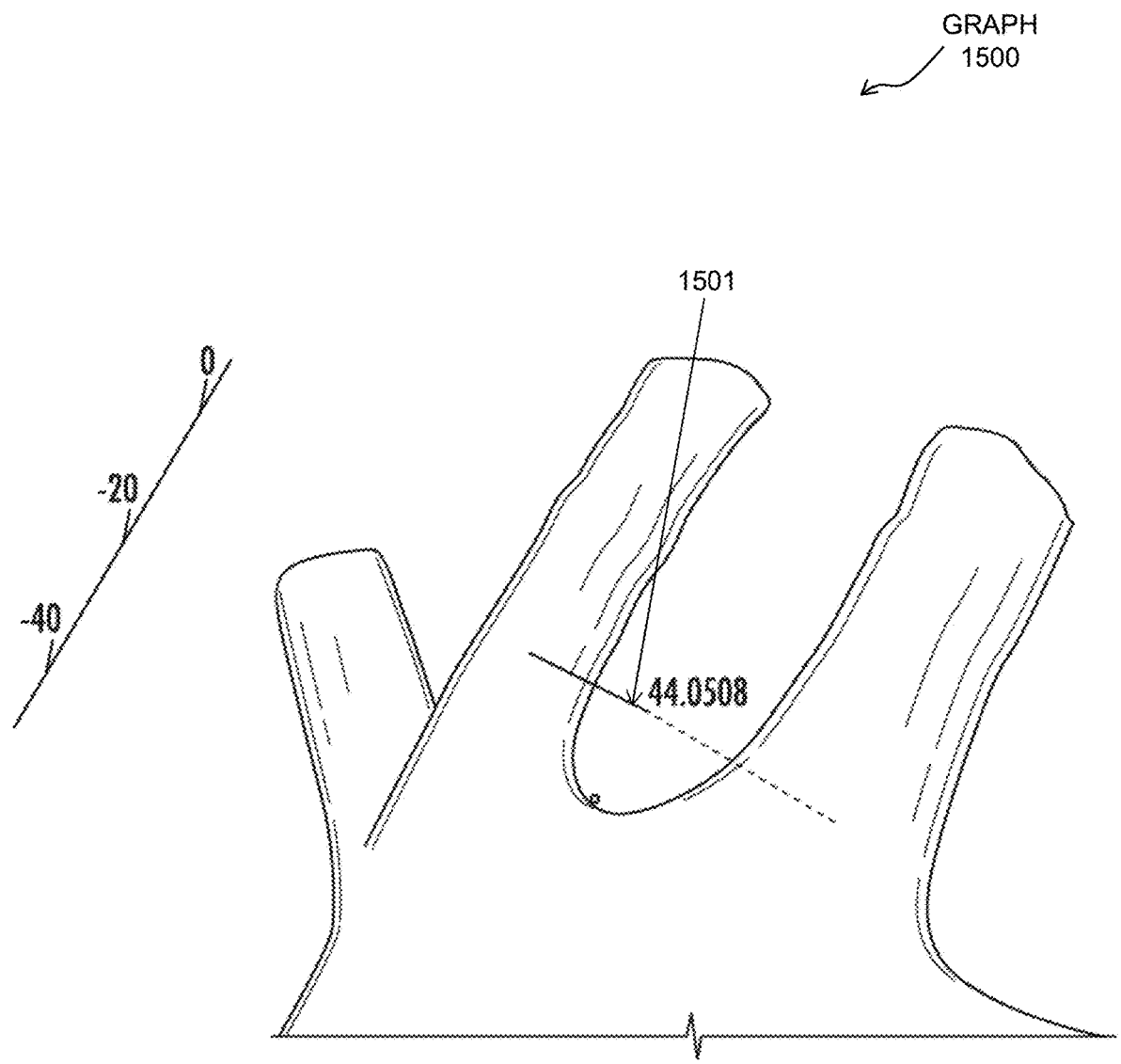
FIG. 15 illustrates a graph according to one or more exemplary embodiments.

Another option includes minimum ridge width constraints. The reconstruction engine 101 can constrain the appendage ridge minimal width in approximately perpendicular direction to the above, by sampling between the ridge search line and the LSPV and appendage centerlines, and constraining each half-width to be at least 0.5 mm, as illustrated in FIG. 15, which illustrates a graph 1500 showing a ridge width computation 1501.

Another option includes minimum valve area constraints. to avoid a shrunken appearance, the reconstruction engine 101 can constrain the valve cross section area to be greater than the sum of PV areas, and greater than the appendage area.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating an anatomically correct reconstruction of atrial anatomy during a cardiac ablation procedure, the method comprising:

receiving sensor data for the atrial anatomy from a catheter during the cardiac ablation procedure;
computing an initial transformation that at least selects a parametric model based on the sensor data;
executing at least one iterative optimization, where the at least one iterative optimization comprises using pyramid data sampling to construct a statistical prior based on the parametric model and applying the parametric model to the sensor data and the statistical prior to produce an isosurface of the atrial anatomy;
generating the anatomically correct reconstruction that includes the isosurface; and
displaying the anatomically correct reconstruction during the cardiac ablation procedure,
wherein the pyramid data sampling comprises:
recursively subdividing a bounding domain into a plurality of voxels organized into multiple pyramid levels, computing a field value array at each pyramid level, and generating a surface mask based on a comparison between the field value array and a threshold parameter.

2. The method of claim 1, wherein the sensor data includes anatomical tags for points from right and left sides of the atrial anatomy.

3. The method of claim 1, wherein the atrial anatomy is a left atrium.

4. The method of claim 1, wherein the parametric model is a fixed model selected based on parameters representing a shape of the atrial anatomy or a substructure thereof.

5. The method of claim 1, wherein the at least one iterative optimization further comprises any one of computing cost and constraint functions, computing cost and constraint derivatives, updating parameters, updating the one or more inputs, updating optimization hyperparameters, or updating one or more tube cuts.

6. The method of claim 1, wherein the at least one iterative optimization comprises a blending of the parametric model with a minimum number of point cloud data of the one or more inputs and the statistical prior to produce the isosurface.

7. The method of claim 1, wherein the anatomically correct reconstruction further includes a three dimensional mesh rendering, or anatomical mesh colorings.

8. The method of claim 1, further comprising:
receiving additional sensor data from the catheter; and
performing at least one additional iterative optimization to adapt the isosurface to the additional sensor data.

9. The method of claim 8, wherein the additional sensor data includes any one of preferred magnet points, subsequent anatomical tags, or user edits.

10. A system for generating an anatomically correct reconstruction of atrial anatomy during a cardiac ablation procedure, the system comprising:
a memory;
a communication interface that is communicatively coupled to a catheter;
one or more processors that are communicatively coupled to the communication interface and the memory, wherein the one or more processors are collectively configured to:
receive sensor data for the atrial anatomy from the catheter during the cardiac ablation procedure,
compute an initial transformation that selects a parametric model based on the sensor data,
execute at least one iterative optimization where the at least one iterative optimization comprises using pyramid data sampling to construct a statistical prior based on the parametric model and applying the parametric model to the sensor data and the statistical prior to produce an isosurface of the atrial anatomy,
generate the anatomically correct reconstruction that includes the isosurface, and
display the anatomically correct reconstruction during the cardiac ablation procedure,
wherein the pyramid data sampling comprises:
recursively subdividing a bounding domain into a plurality of voxels organized into multiple pyramid levels, computing a field value array at each pyramid level, and generating a surface mask based on a comparison between the field value array and a threshold parameter.

11. The system of claim 10, wherein the sensor data includes anatomical tags for points from right and left sides of the atrial anatomy.

12. The system of claim 10, wherein the atrial anatomy is a left atrium.

13. The system of claim 10, wherein the parametric model is a fixed model selected based on parameters representing a shape of the atrial anatomy or a substructure thereof.

14. The system of claim 10, wherein the at least one iterative optimization further comprises any one of computing cost and constraint functions, computing cost and constraint derivatives, updating parameters, updating the one or more inputs, updating optimization hyperparameters, or updating one or more tube cuts.

15. The system of claim 10, wherein the at least one iterative optimization comprises a blending of the parametric model with a minimum number of point cloud data of the sensor data and the statistical prior to produce the isosurface.

16. The system of claim 10, wherein the anatomically correct reconstruction further includes a three dimensional mesh rendering, or anatomical mesh colorings.

17. The system of claim 10, wherein the one or more processors are further collectively configured to:
receive additional sensor data from the catheter, and
perform additional iterative optimization to adapt the isosurface to the additional sensor data.

18. The system of claim 17, wherein the additional sensor data includes any one of preferred magnet points, subsequent anatomical tags, or user edits.

19. The method of claim 1, wherein the at least one iterative optimization further comprises:
selecting a subset of voxels based on an octree mask that preserves higher resolution sampling near an atrium surface and lower resolution elsewhere.

20. The system of claim 10, wherein the at least one iterative optimization further comprises:
selecting a subset of voxels based on an octree mask that preserves higher resolution sampling near an atrium surface and lower resolution elsewhere.

* * * * *